(12) United States Patent
Allen

(10) Patent No.: US 12,552,134 B2
(45) Date of Patent: Feb. 17, 2026

(54) BUILDING PRODUCTS AND ASSOCIATED METHODS FOR PROVIDING CONTOURED AND ELEVATED FEATURES FOR ARTIFICiAL SURFACES

(71) Applicant: Chosen Products, LLC, Dalton, GA (US)

(72) Inventor: Bernard Ty Allen, Dalton, GA (US)

(73) Assignee: Chosen Products, LLC, Dalton, GA (US)

( * ) Notice: Subject to any disclaimer, the term of this patent is extended or adjusted under 35 U.S.C. 154(b) by 302 days.

(21) Appl. No.: 18/315,627

(22) Filed: May 11, 2023

(65) Prior Publication Data
US 2023/0278313 A1     Sep. 7, 2023

Related U.S. Application Data

(63) Continuation-in-part of application No. 16/286,143, filed on Feb. 26, 2019, now abandoned.

(51) Int. Cl.
*B32B 5/32*         (2006.01)
*B32B 3/06*         (2006.01)
(Continued)

(52) U.S. Cl.
CPC ............... *B32B 5/32* (2013.01); *B32B 3/06* (2013.01); *B32B 3/30* (2013.01); *B32B 5/18* (2013.01);
(Continued)

(58) Field of Classification Search
CPC ............... Y10T 428/23; Y10T 428/233; Y10T 428/239; Y10T 428/24479;
(Continued)

(56) References Cited

U.S. PATENT DOCUMENTS 3,572,698 A * 3/1971 Greenly ............... A63B 9/00
                                                 482/36
4,546,024 A * 10/1985 Brown ............. E04F 15/02016
                                                 428/44

(Continued)

FOREIGN PATENT DOCUMENTS

WO    WO-2019131167 A1 * 7/2019 ............ B32B 37/12

OTHER PUBLICATIONS

Machine translation (Google patents) of WO 2019/131167 A1. Translated May 3, 2025. (Year: 2025).*
U.S. Appl. No. 16/286,143, filed Feb. 26, 2019.

*Primary Examiner* — Maria V Ewald
*Assistant Examiner* — Ethan A. Utt
(74) *Attorney, Agent, or Firm* — Widerman Malek, PL; Mark Malek

(57) ABSTRACT

A modular foundation structure for artificial surface systems may include a plurality foundation sections. Each of the foundation section may comprise a structure base layer, an adhesive layer, and an impact and thermal protective layer. The adhesive layer may cover the structural base layer, and the impact and thermal protective layer may be attached to the structural base layer via the adhesive layer. The foundation sections may be provided as separate foundation sections that may be positionable to be attached to one another to form the modular foundation structure. The foundation sections may be attachable one another with a section adhesive. Embodiments may include a connection edge that may be positioned to surround and abut a perimeter of the modular foundation structure. Embodiments may also include an artificial surface layer that may be positioned to cover an upper surface area of the modular foundation structure.

20 Claims, 21 Drawing Sheets

(51) Int. Cl.
*B32B 3/30* (2006.01)
*B32B 5/18* (2006.01)
*B32B 7/12* (2006.01)
*E01C 3/00* (2006.01)
*E01C 13/02* (2006.01)
*E01D 18/00* (2006.01)
*E01D 101/40* (2006.01)
*E02B 3/10* (2006.01)
*E02B 3/14* (2006.01)
*E02D 17/20* (2006.01)
*E21D 9/14* (2006.01)

(52) U.S. Cl.
CPC ............... *B32B 7/12* (2013.01); *E01C 3/006* (2013.01); *E01C 13/02* (2013.01); *E01D 18/00* (2013.01); *E02B 3/106* (2013.01); *E02B 3/14* (2013.01); *E02D 17/205* (2013.01); *E21D 9/14* (2013.01); *B32B 2255/102* (2013.01); *B32B 2255/26* (2013.01); *B32B 2266/0228* (2013.01); *B32B 2266/025* (2013.01); *B32B 2307/30* (2013.01); *B32B 2451/00* (2013.01); *E01D 2101/40* (2013.01); *E02D 2300/0006* (2013.01); *E02D 2300/0025* (2013.01); *E02D 2300/0046* (2013.01)

(58) Field of Classification Search
CPC ..... Y10T 428/24496; Y10T 428/24504; Y10T 428/24521; Y10T 428/24537; Y10T 428/2457; Y10T 428/24612; Y10T 428/24942; Y10T 428/24992; Y10T 428/249953; Y10T 428/249975; Y10T 428/249981; Y10T 428/249982; Y10T 428/249983; Y10T 428/249984; Y10T 428/249985; Y10T 428/249987; Y10T 428/249991; Y10T 428/28; Y10T 428/2848; Y10T 428/2852; Y10T 428/2878; Y10T 428/2896; Y10T 428/31855; Y10T 428/31909; Y10T 428/31913; Y10T 428/31938; B32B 1/00; B32B 3/00; B32B 3/02; B32B 3/26; B32B 3/263; B32B 5/00; B32B 5/18; B32B 5/22; B32B 7/00; B32B 7/02; B32B 7/022; B32B 7/027; B32B 7/04; B32B 7/12; B32B 27/00; B32B 27/04; B32B 27/06; B32B 27/065; B32B 27/08; B32B 27/30; B32B 27/302; B32B 27/32; B32B 27/40; B32B 2266/02; B32B 2262/0214; B32B 2262/0221; B32B 2262/025; B32B 2262/08; B32B 2262/14; B32B 2305/02; B32B 2305/022; B32B 2307/30; B32B 2307/304; B32B 2307/50; B32B 2307/558; B32B 2307/56; E01C 13/00; E01C 13/04; E01C 13/045; E01C 13/08; A63B 9/00; A63B 2009/006; A63B 67/00; A63B 67/02; A63B 71/00; A63B 71/0054; A63B 2071/0063; A63B 2071/0072; A63B 2208/12; A63B 2209/00; A63B 2209/14; A63H 33/00; A63H 33/04; A63H 33/14
USPC ......... 428/15, 17, 68, 71, 76, 156, 158, 159, 428/161, 163, 167, 172, 212, 218, 304.4, 428/314.4, 316.6, 317.1, 317.3, 317.5, 428/317.7, 318.4, 319.3, 319.7, 319.9, 428/343, 354, 355 R, 355 EN, 355 N, 428/500, 515, 516, 523; 473/131, 415, 473/497; D21/811, 826, 827, 814; 482/23, 35

See application file for complete search history.

(56) References Cited

U.S. PATENT DOCUMENTS

| | | | | |
|---|---|---|---|---|
| 5,916,034 | A * | 6/1999 | Lancia | A63B 67/02 473/157 |
| 2003/0096657 | A1* | 5/2003 | Knox | A63B 67/02 473/150 |
| 2009/0117311 | A1* | 5/2009 | Kuzmin | A63H 33/08 428/44 |
| 2018/0171565 | A1* | 6/2018 | Kruger | A63C 19/065 |
| 2019/0203425 | A1* | 7/2019 | Sawyer | E01C 13/08 |
| 2019/0263090 | A1* | 8/2019 | Allen | A47C 1/143 |

* cited by examiner

BUILDING PRODUCTS AND ASSOCIATED METHODS FOR PROVIDING CONTOURED AND ELEVATED FEATURES FOR ARTIFICiAL SURFACES

RELATED APPLICATIONS

This application is a continuation-in-part application to and claims priority under 35 U.S.C. § 120 to U.S. patent application Ser. No. 16/286,143 filed on Feb. 26, 2019 and titled Building Products and Associated Methods for Providing Contoured and Elevated Features for Artificial Surfaces which, in turn, claims priority under 35 U.S.C. § 119(e) of U.S. Patent Application Ser. No. 62/635,149 titled BUILDING PRODUCTS AND ASSOCIATED METHODS FOR PROVIDING CONTOURED AND ELEVATED FEATURES FOR ARTIFICIAL SURFACES, filed Feb. 26, 2018, the entire contents of which are incorporated herein, except to the extent that disclosure therein conflicts with disclosure herein.

FIELD OF THE INVENTION

The present invention relates in general to the field of artificial turf and activity systems. Such artificial turf systems may be used for playgrounds, sports playing fields, synthetic lawns, golf courses, and other similar types of fields or surfaces.

BACKGROUND OF THE INVENTION

In general, artificial turf systems, such as sports playing fields, are often made of a mix of natural and/or synthetic/artificial material. A foundation layer (e.g., dirt, gravel, sand or other suitable material) is sometimes provided. A padding layer may then be installed, and the artificial grass is positioned on top.

Design considerations for sports playing fields include athlete's safety, surface hardness, water drainage, heat management, ease of assembly/installation, durability, longevity, uniformity, resistance to change in weather according to seasons, stability, etc. Playgrounds, synthetic lawns, golf courses, and other similar types of fields or surfaces may also involve such considerations.

For example, U.S. Pat. No. 5,467,977 to Beck and entitled "Portable Pitching Mound" is directed to a portable pitching mound that includes an expanded plastic core covered with a flexible, sheet-like artificial turf material.

Also, U.S. Pat. No. 5,941,041 to Robinson et al. and entitled "Play Structure Building Panel" is directed to a modular play structure building panel which can be connected to other identical panels to construct various play structures, such as tunnels, cylindrical towers, and walls.

However, it may be desirable to provide safer, simpler and more cost effective contoured and elevated features for artificial surfaces such as turf fields, playgrounds, commercial and residential property yards, and that are impact resistant, insulative, safer, stable, durable and flexible.

SUMMARY OF THE INVENTION

With the foregoing in mind, embodiments of the invention are related to modular, protective, contoured and elevated features for artificial surfaces such as turf fields. The modular foundation structure for artificial surface systems may include a plurality foundation sections. Each of the foundation section may comprise a structure base layer, an adhesive layer, and an impact and thermal protective layer. The structural base layer may include a shaped rigid foam having contoured and elevated features. The adhesive layer may cover the structural base layer, and the impact and thermal protective layer may be attached to the structural base layer via the adhesive layer.

The foundation sections may be provided as separate foundation sections that may be positionable to be attached to one another to form the modular foundation structure. The foundation sections may be attachable one another with a section adhesive. Embodiments of the present invention may include a connection edge that may be positioned to surround and abut a perimeter of the modular foundation structure. Embodiments of the present invention may also include an artificial surface layer that may be positioned to cover an upper surface area of the modular foundation structure. The artificial surface layer may comprise one of artificial turf and poured-in-place rubber.

At least one of the foundation structures may include one or more elongated slots. The elongated slots may be configured to engage with existing standing supports such that the plurality of foundation sections may be positionable and attachable to one another to form the modular foundation structure around the existing standing supports. At least one of the foundation sections may include a blind hole that may be sized to envelop a support pad associated with at least one of the existing standing supports. Embodiments of the present invention may include a tunnel extending through multiple foundation sections of the plurality of foundation sections. The tunnel may be corrugated.

The connection edge may comprise high-density polyethylene (HDPE). The foundation sections may be attached to one another to have a shape defined by at least one of a mound, tunnel mound, berm, hill, platform, bank, pyramid, wall, bridge, block, and stage. The structural base layer may be positioned over a water protection layer. The section adhesive may comprise one of expandable urethane glue and Expanded Polypropylene (EPP) sheets. The structural base layer may comprise one of Expanded Polystyrene (EPS) and Expanded polyethylene (EPE). The impact and thermal protective layer may comprise Expanded Polypropylene (EPP) foam.

Some advantages of the contoured and elevated features and method of the present embodiments include that such features can be modular components that are off-the-shelf or custom, and that absorb repeated impacts which also serves to attenuate impacts and provide a fall safety component. The embodiments of the contoured and elevated features are also insulative with a relatively high melting point, as well as resistant to various chemicals and oils.

BRIEF DESCRIPTION OF THE DRAWINGS

The example embodiments are best understood from the following detailed description when read with the accompanying drawing figures. In fact, the dimensions may be arbitrarily increased or decreased for clarity of discussion. Wherever applicable and practical, like reference numerals refer to like elements.

FIG. 1A is a schematic top view illustrating the example embodiment of the modular foundation structure for the tunnel mound.

FIG. 1B is a schematic perspective view illustrating the tunnel mound of FIG. 1A.

FIG. 1C is a schematic first side view illustrating the tunnel mound of FIG. 1A.

FIG. 1D is a schematic second side view with enlarged portion illustrating the tunnel mound of FIG. 1A.

FIG. 2A is a schematic top view illustrating the example embodiment of the modular foundation structure for the mound.

FIG. 2B is a schematic perspective view illustrating the mound of FIG. 2A.

FIG. 2C is a schematic side view with enlarged portion illustrating the mound of FIG. 2A.

FIG. 2D is a schematic front view illustrating the mound of FIG. 2A.

FIG. 3A is a schematic top view illustrating the example embodiment of the modular foundation structure for the recliner.

FIG. 3B is a schematic perspective view illustrating the recliner of FIG. 3A.

FIG. 3C is a schematic side view with enlarged portion illustrating the recliner of FIG. 3A.

FIG. 3D is a schematic front side view illustrating the recliner of FIG. 3A.

FIG. 4A is a schematic side view with enlarged portion illustrating the example embodiment of the bench.

FIG. 4B is a schematic perspective view illustrating the bench of FIG. 4A.

FIG. 4C is another schematic perspective view illustrating the bench of FIG. 4A with turf.

FIG. 4D is a schematic top view illustrating the bench of FIG. 4A.

FIG. 4E is a schematic top view illustrating an example embodiment of a double wide bench of FIG. 4A.

FIG. 5A is a schematic top view illustrating the example embodiment of the bridge.

FIG. 5B is a schematic perspective view illustrating the bridge of FIG. 5A.

FIG. 5C is a schematic side view with enlarged portion illustrating the bridge of FIG. 5A.

FIG. 5D is a schematic front side view illustrating the bridge of FIG. 5A.

FIG. 6A is a schematic top view illustrating the example embodiment of the berm.

FIG. 6B is a schematic perspective view illustrating the berm of FIG. 6A.

FIG. 6C is a schematic side view with enlarged portion illustrating the berm of FIG. 6A.

FIG. 6D is a schematic front side view illustrating the berm of FIG. 6A.

DETAILED DESCRIPTION OF THE PREFERRED EMBODIMENTS

Figure 1A:
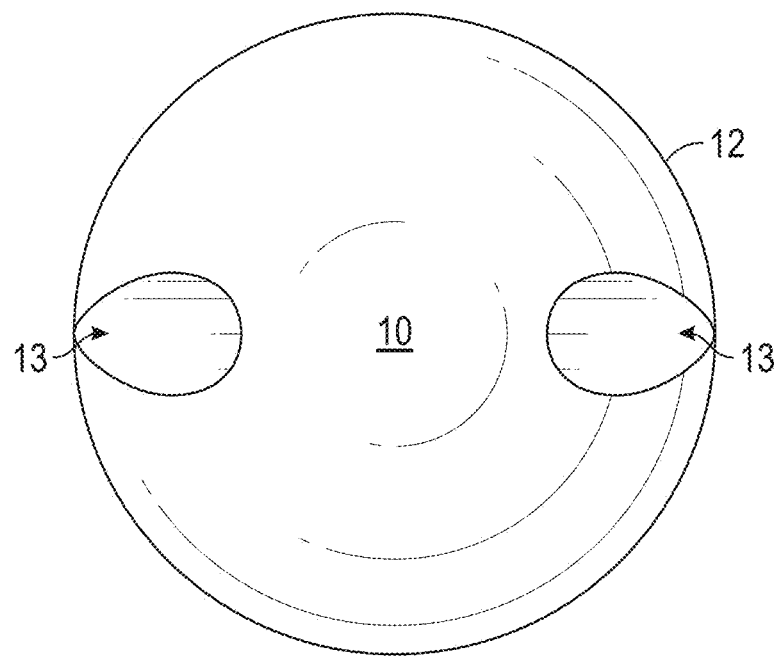
FIGS. 1A-1D are schematic views illustrating an example embodiment of a tunnel mound including a modular foundation structure in accordance with features of the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

As discussed above, artificial surfaces (e.g., turf surfaces) and systems are known. Such artificial surface systems may include the use of synthetic grass-like fibers bound with a backing material and filled with a material such as rubber pieces. Such artificial surface systems may include poured-in-place rubber surfaces, such as for playgrounds. The artificial surfaces are for use on various support layers such as concrete or compacted dirt or gravel with an underlayment therebetween, as would be appreciated by those skilled in the art.

FIGS. 1-6 illustrate various modular contoured and elevated features or components for artificial surface systems. The figures include top, side and perspective views illustrating example embodiments of a tunnel mound 10, mound 20, recliner 30, bench 40, bridge 50 and berm 60 in accordance with features of the present invention. These modular foundation structure components may be off-the-shelf or custom sized for desired applications integrated with artificial surfaces including playgrounds, athletic fields, residential and/or commercial synthetic surfaces, for example.

Figure 1B:
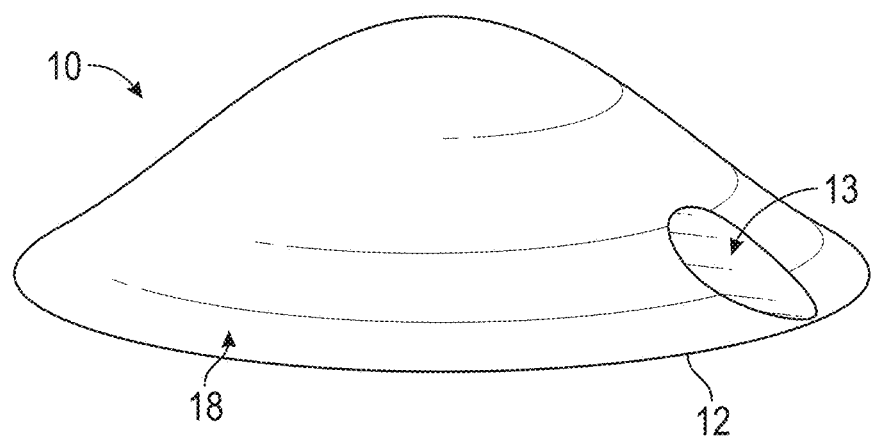
Figure 1C:
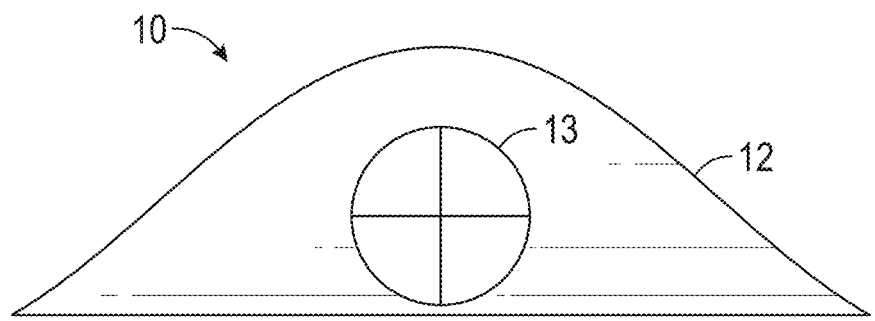
Figure 1D:
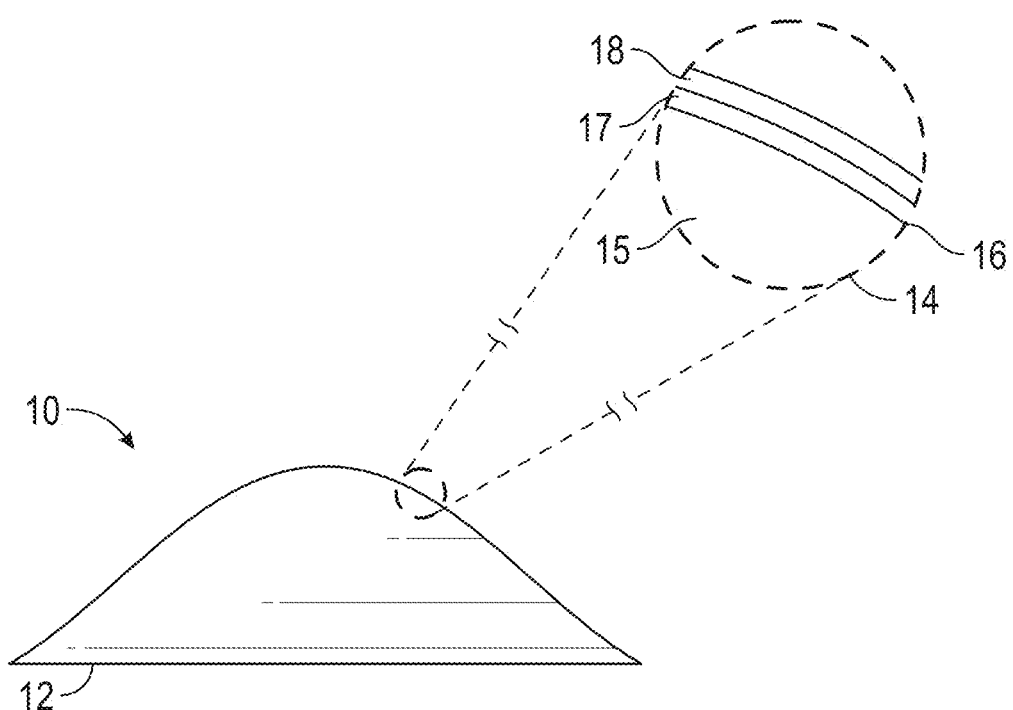

FIGS. 1A-1D are schematic views illustrating an example embodiment of a tunnel mound 10 including a modular foundation structure 12 in accordance with features of the present invention. FIG. 1A is a schematic top view illustrating the modular foundation structure 12 for the tunnel mound 10. The tunnel mound 10 includes a tunnel 13, for example, bored through the foundation structure 12 and lined with a hard plastic. FIG. 1B is a schematic perspective view illustrating the tunnel mound 10 covered with synthetic turf 18, FIG. 1C is a schematic first side view illustrating the tunnel mound 10, and FIG. 1D is a schematic second side view with enlarged portion 14 illustrating the layers of the modular foundation structure 12 of the tunnel mound 10, which will be described in further detail below.

Figure 2A:
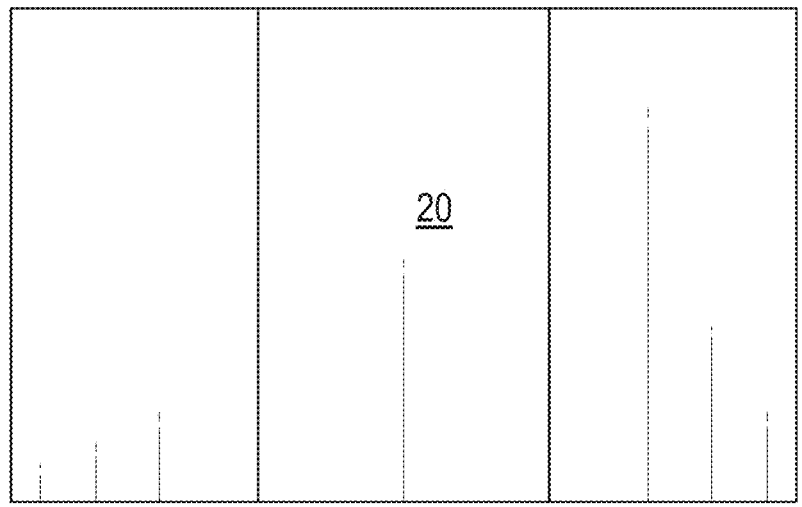
FIGS. 2A-2D are schematic views illustrating an example embodiment of a mound including a modular foundation structure in accordance with features of the present invention.
Figure 2B:
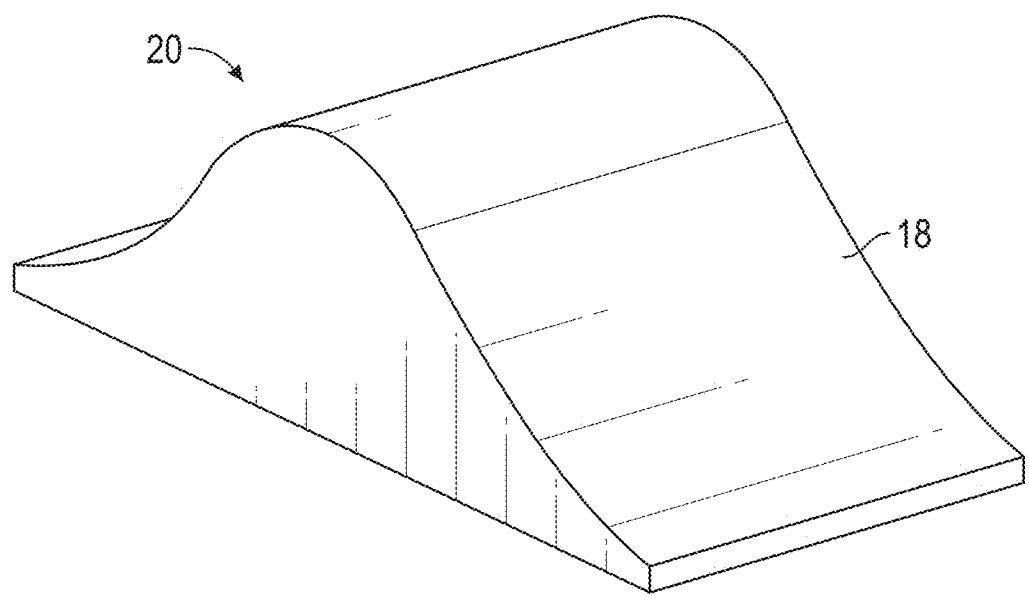
Figure 2C:
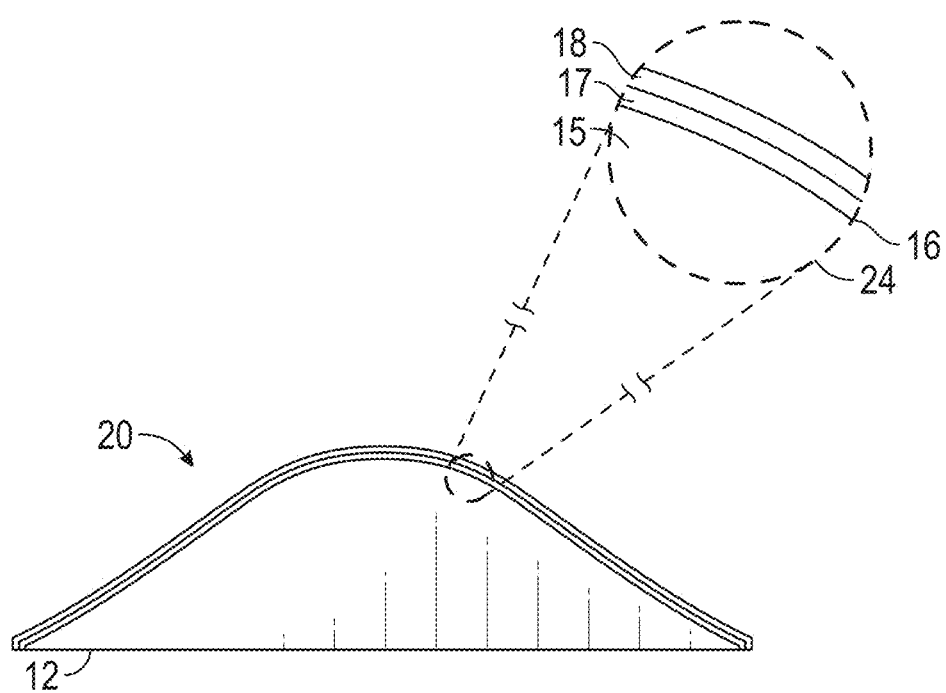
Figure 2D:
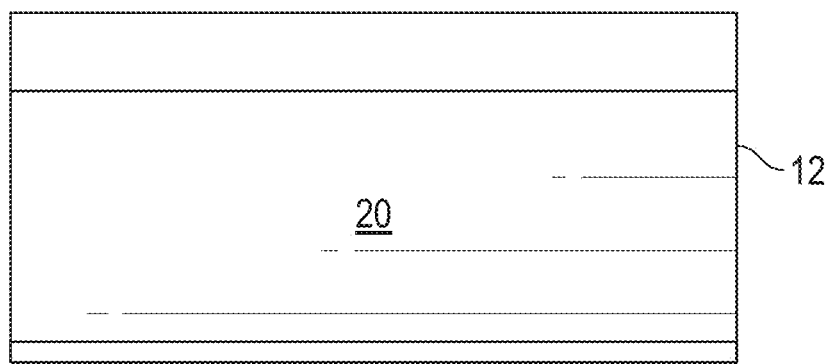

FIGS. 2A-2D are schematic views illustrating an example embodiment of a mound 20 including a modular foundation structure 12 in accordance with features of the present invention. FIG. 2A is a schematic top view illustrating the modular foundation structure 12 for the mound 20. FIG. 2B is a schematic perspective view illustrating the mound 20 covered with synthetic turf 18, FIG. 2C is a schematic side view with enlarged portion 24 illustrating the layers of the modular foundation structure 12 of the mound 20, and FIG. 2D is a schematic front view illustrating the mound 20.

Figure 3A:
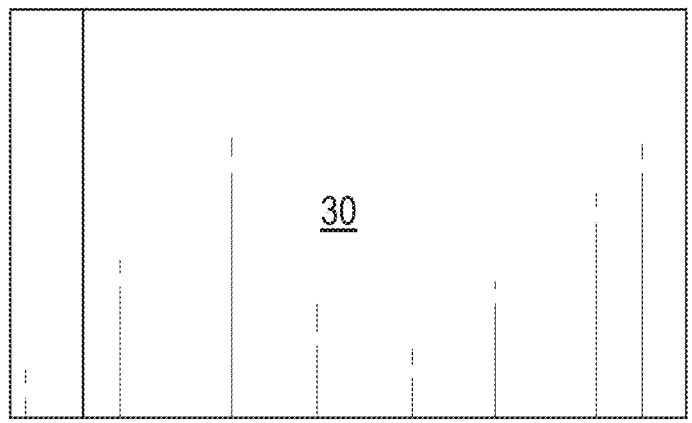
FIGS. 3A-3D are schematic views illustrating an example embodiment of a recliner including a modular foundation structure in accordance with features of the present invention.
Figure 3B:
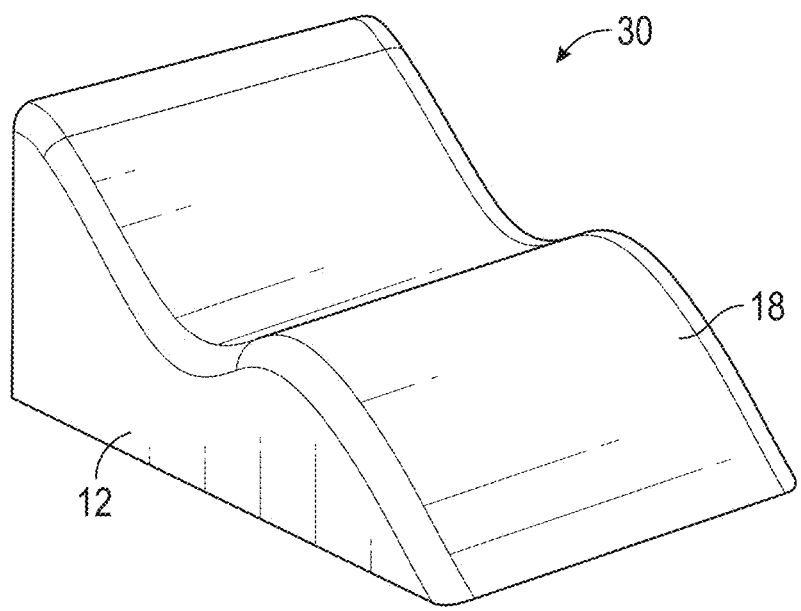
Figure 3C:
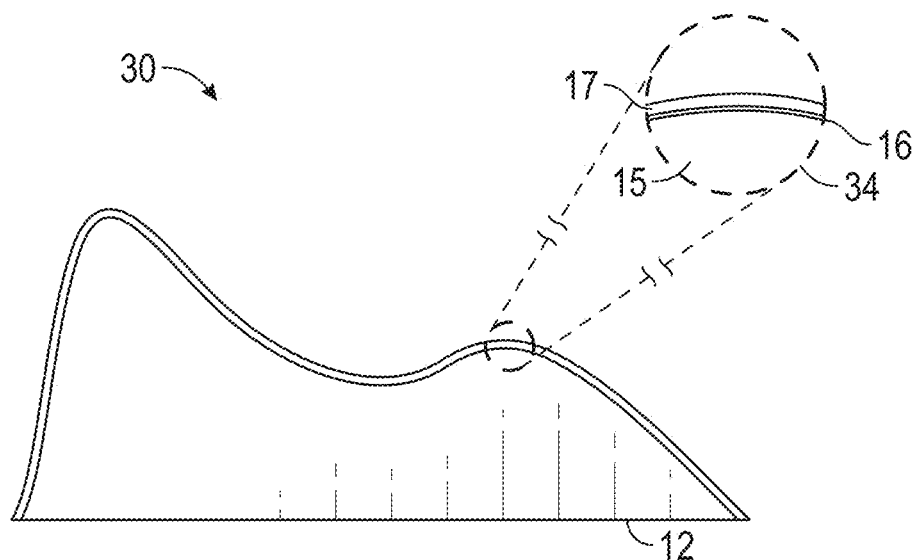
Figure 3D:
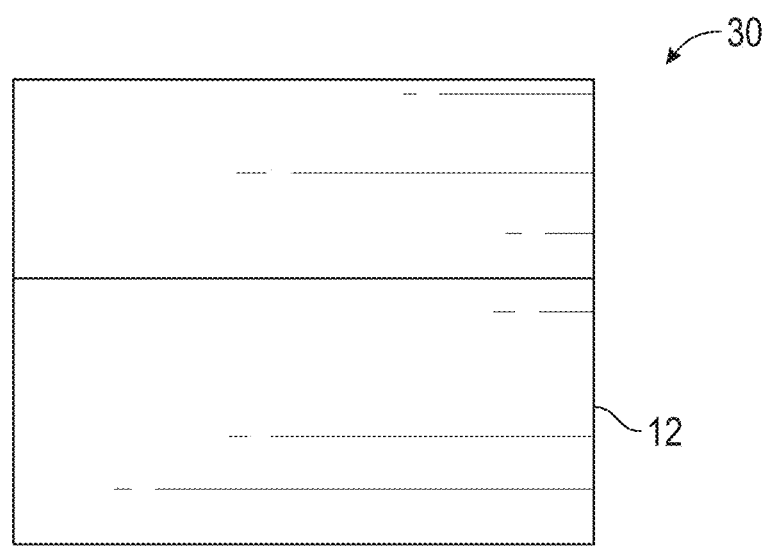

FIGS. 3A-3D are schematic views illustrating an example embodiment of a recliner 30 including a modular foundation structure 12 in accordance with features of the present invention. FIG. 3A is a schematic top view illustrating the modular foundation structure 12 for the recliner 30. FIG. 3B is a schematic perspective view illustrating the recliner 30 covered with synthetic turf 18, FIG. 3C is a schematic side view with enlarged portion 34 illustrating the layers of the modular foundation structure 12 of the recliner 30, and FIG. 3D is a schematic front side view illustrating the recliner 30.

Figure 4A:
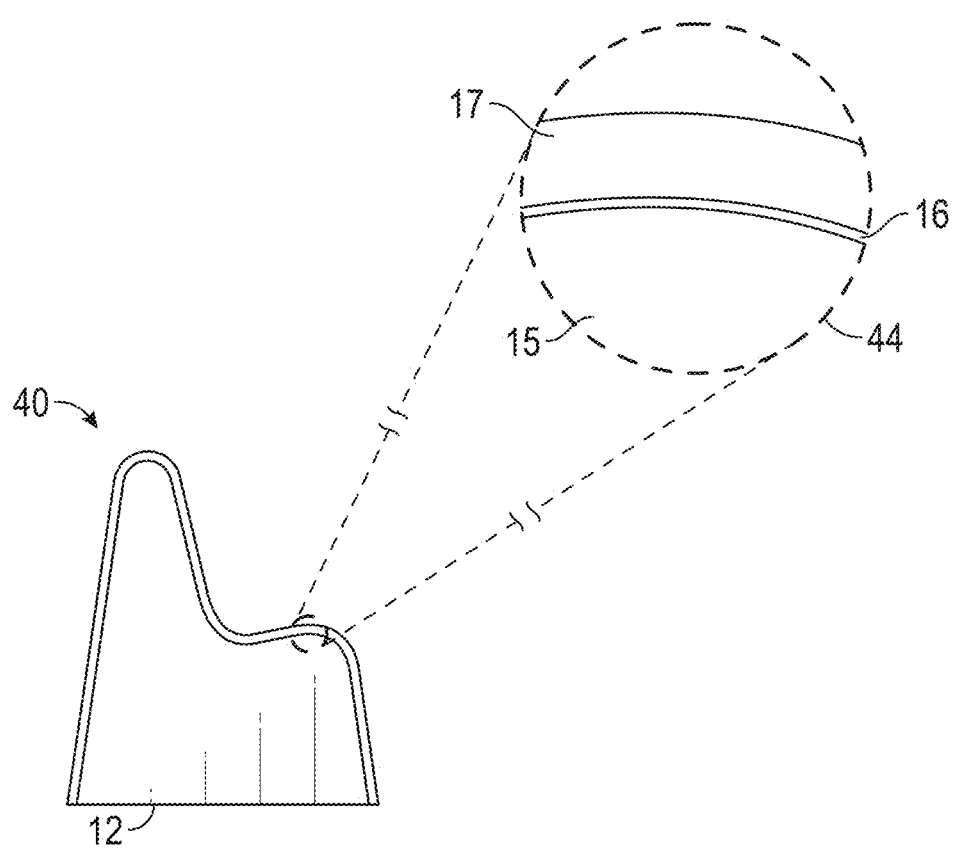
FIGS. 4A-4E are schematic views illustrating an example embodiment of a bench including a modular foundation structure in accordance with features of the present invention.
Figure 4B:
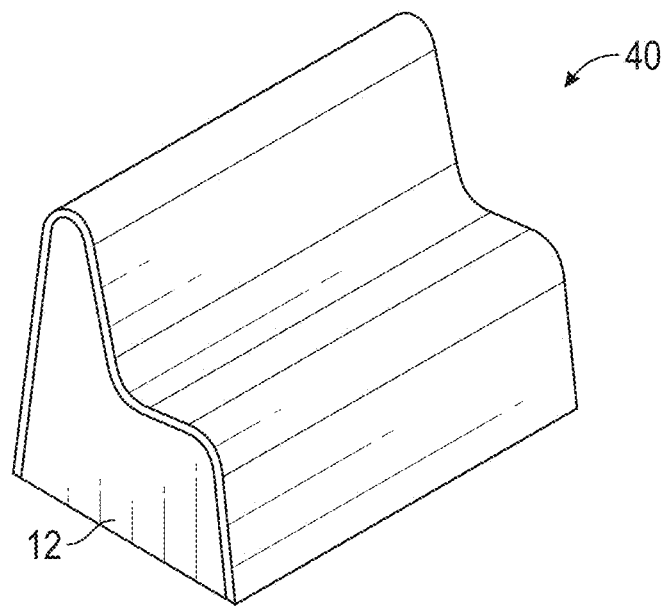
Figure 4C:
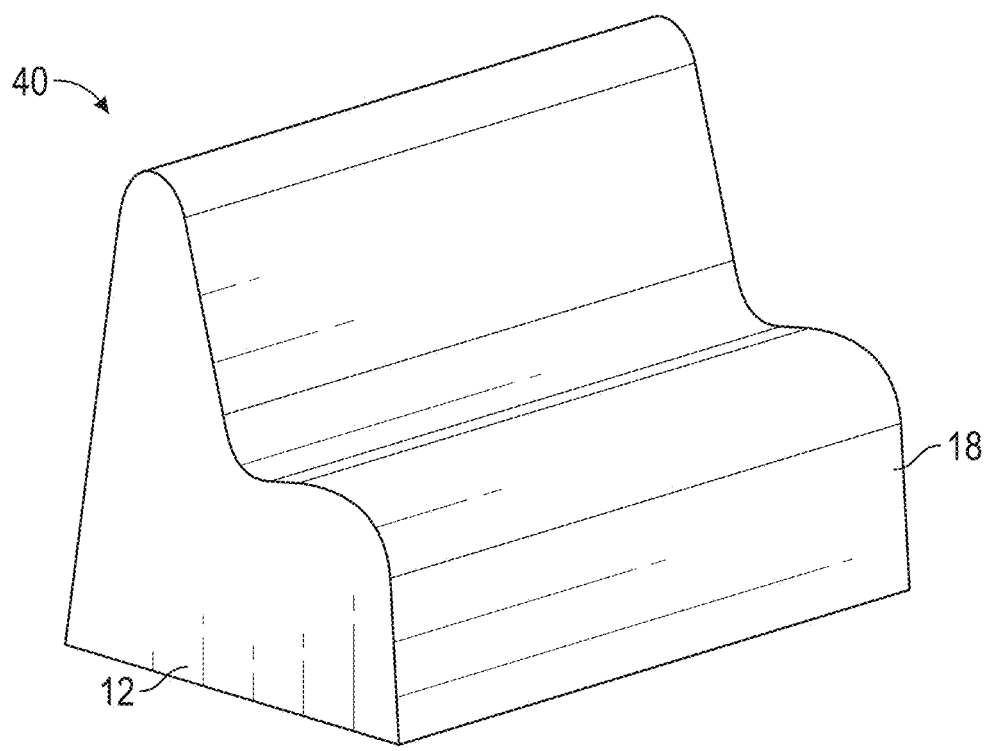
Figure 4D:
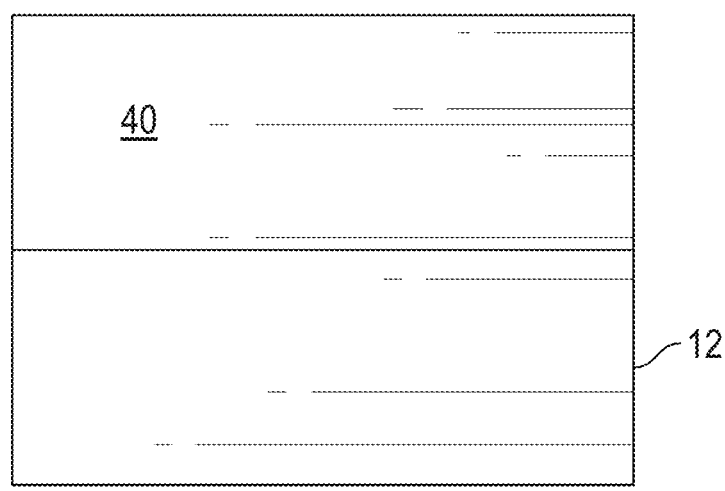
Figure 4E:
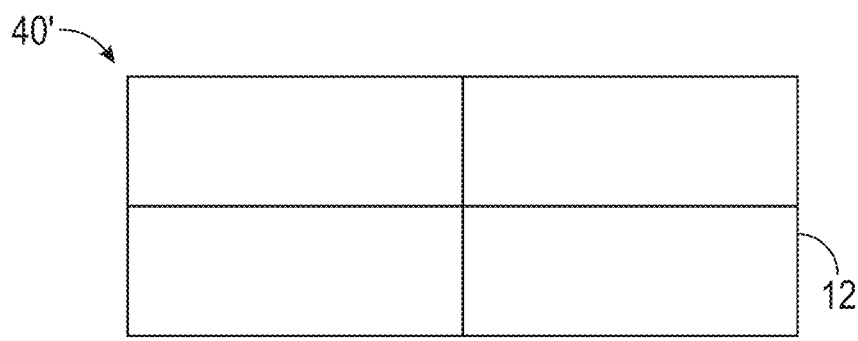

FIGS. 4A-4E are schematic views illustrating an example embodiment of a bench 40 including a modular foundation structure 12 in accordance with features of the present invention. FIG. 4A is a schematic side view with enlarged portion 44 illustrating the layers of the modular foundation structure 12 of the bench 40. FIG. 4B is a schematic perspective view illustrating the bench 40, FIG. 4C is another schematic perspective view illustrating the bench 40 covered with synthetic turf 18, FIG. 4D is a schematic top view illustrating the bench 40, and FIG. 4E is a schematic top view illustrating an example embodiment of a double wide bench 40'.

Figure 5A:
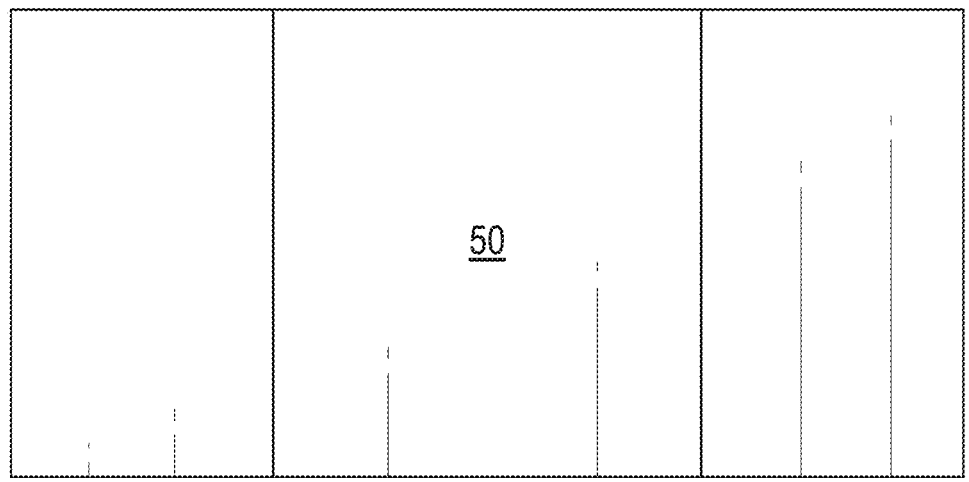
FIGS. 5A-5D are schematic views illustrating an example embodiment of a bridge including a modular foundation structure in accordance with features of the present invention.
Figure 5B:
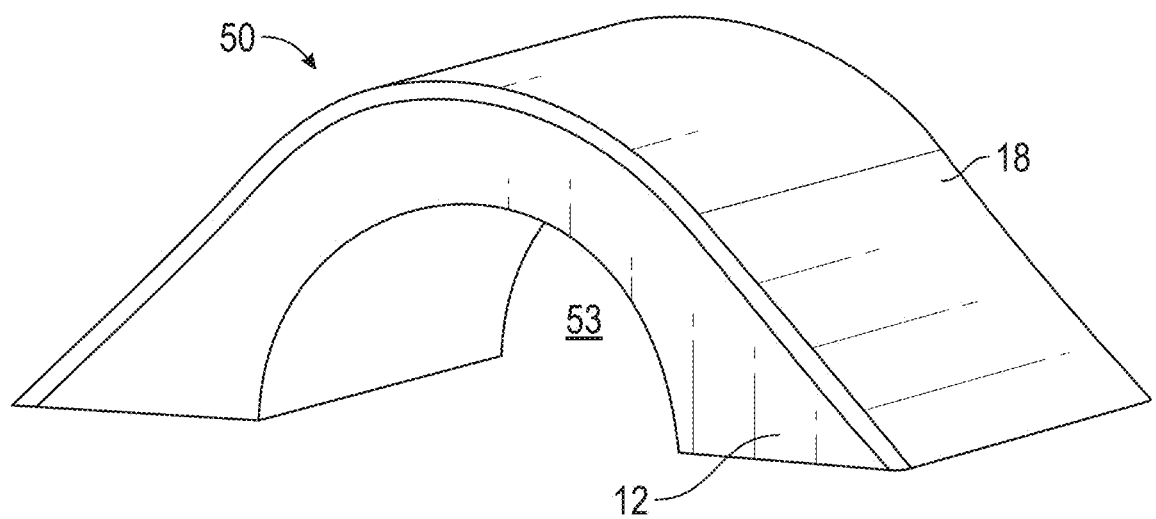
Figure 5C:
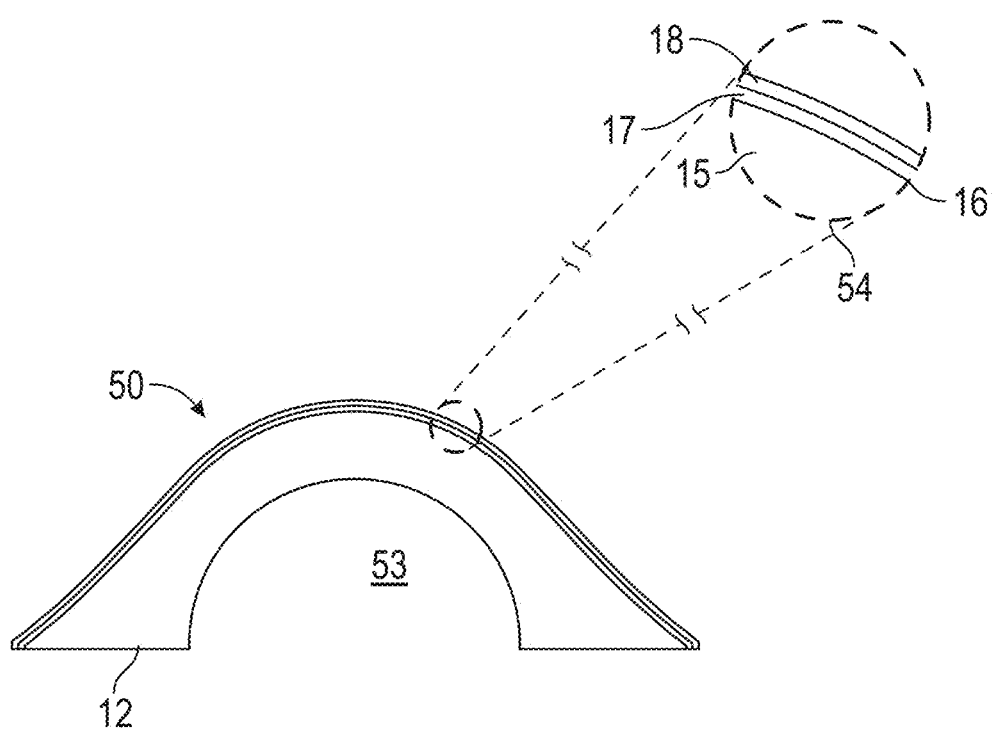
Figure 5D:
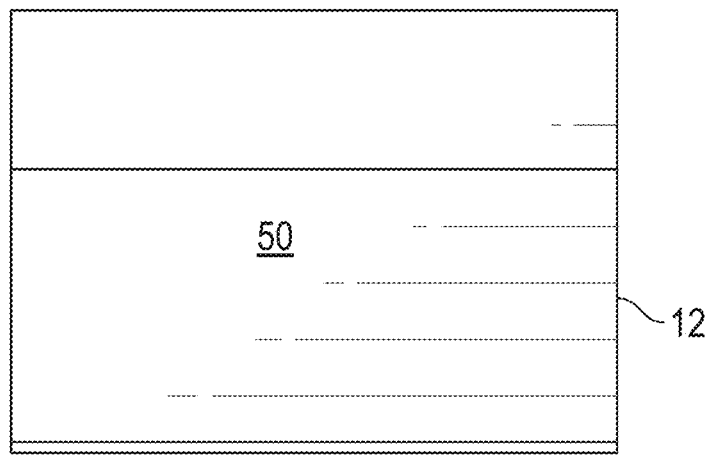

FIGS. 5A-5D are schematic views illustrating an example embodiment of a bridge 50 including a modular foundation structure 12 in accordance with features of the present invention. FIG. 5A is a schematic top view illustrating the bridge 50. FIG. 5B is a schematic perspective view illustrating the bridge 50 covered with synthetic turf 18, and including an underpass 53 or space. FIG. 5C is a schematic side view with enlarged portion 54 illustrating the layers of the modular foundation structure 12 of the bridge 50, and FIG. 5D is a schematic front side view illustrating the bridge 50.

Figure 6A:
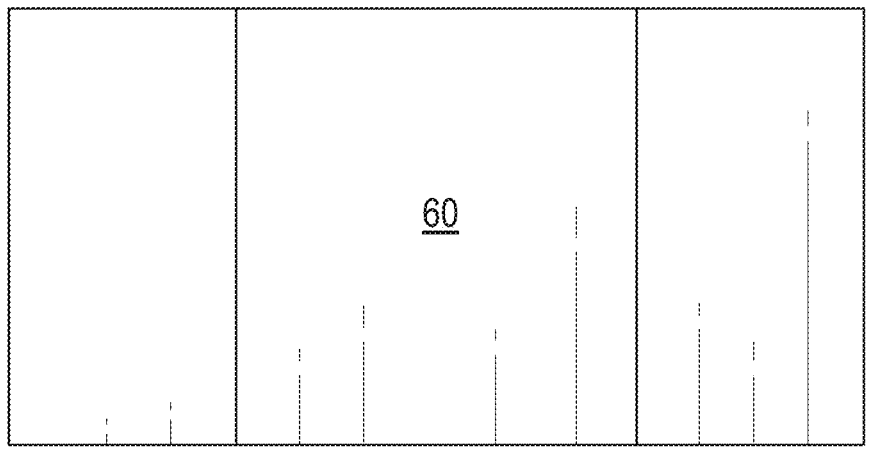
FIGS. 6A-6D are schematic views illustrating an example embodiment of a berm in accordance with features of the present invention.
Figure 6B:
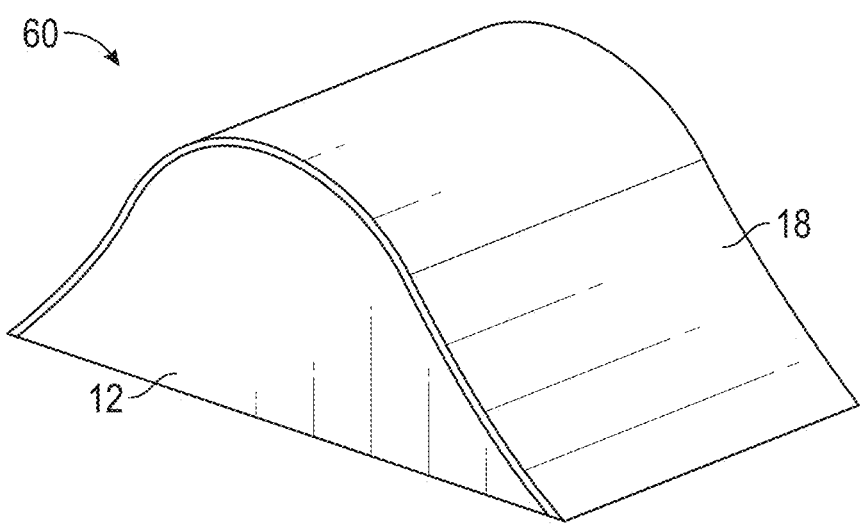
Figure 6C:
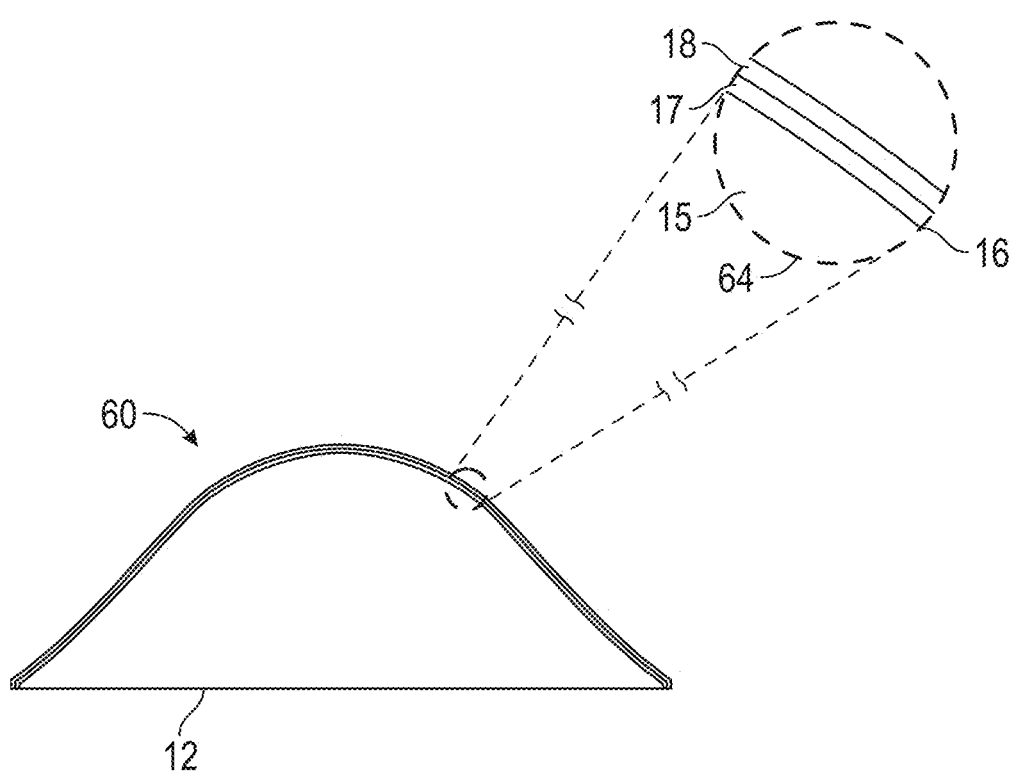
Figure 6D:
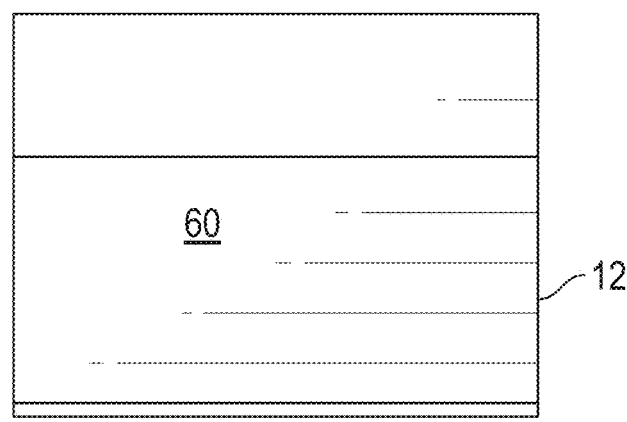

FIGS. 6A-6D are schematic views illustrating an example embodiment of a berm 60 including a modular foundation structure 12 in accordance with features of the present invention. FIG. 6A is a schematic top view illustrating the berm 60. FIG. 6B is a schematic perspective view illustrating the berm 60 covered with synthetic turf 18, FIG. 6C is a schematic side view with enlarged portion 64 illustrating the layers of the modular foundation structure 12 of the berm 60, and FIG. 6D is a schematic front side view illustrating the berm 60.

The modular foundation structure 12 includes a structural base layer 15 comprising a shaped rigid foam having contoured and elevated features. An adhesive layer 16 covers the structural base layer 15. An impact and thermal protective layer 17 is attached to the structural base layer 15 via the adhesive layer 16. The impact and thermal protective layer 17 is configured to support an artificial surface layer 18, such as synthetic turf grass or rubber. The impact and thermal protective layer 17 has a relatively higher melting point and compression recovery factor than the structural base layer, as will be discussed below.

The impact and thermal protective layer may have a melting point of about 300 degrees Fahrenheit, and the structural base layer has a melting point of less than 200 degrees Fahrenheit. The impact and thermal protective layer may be configured to support an artificial surface layer including artificial turf or poured-in-place rubber.

The shaped rigid foam defining the structural base layer 15 is preferably a closed-cell foam such as Expanded Polystyrene (EPS) or Expanded polyethylene (EPE). The adhesive may be a closed cell foam adhesive, and the impact and thermal protective layer 17 may be a bead molded Expanded Polypropylene (EPP) foam. Of course, other materials with substantially similar properties may be applicable. The shaped rigid foam with contoured and elevated features defines the mound 10, tunnel mound 20, reclined chair 30, bench 40, bridge 50 and/or the berm 60, as discussed above. Of course, other shapes are contemplated as would be appreciated by those skilled in the art.

Custom shaped landscapes with various contoured and elevated features may be provided by a landscape architect. Such custom shapes would be formed in the rigid foam to define the structural base layer 15, prior to layering with the adhesive layer 16 and the impact and thermal protective layer 17 attached thereto. The custom shape is configured to support the artificial surface layer 18, such as synthetic turf grass or rubber.

As such, the shapes (e.g., custom, tunnel mound, mound, recliner, bench, bridge and berm) are created using the rigid foam. Once the shapes are created, a layer of EPP foam is then applied to the top using a closed cell expanded foam adhesive. This EPP layer varies in thickness depending on use but a preferred example thickness is ½ inch.

Because of the low compressive properties and low melting point of EPS, it has been determined that if synthetic turf is put directly over the top, the heat generated under the turf can reach as high as 200 degrees F. The melting point of EPS is roughly 175 degrees, so melting of the EPS is a serious concern. Also, a concern is that once the EPS foam shape is compressed (e.g. from an impact) it does not recover to its original form.

Thus, in view of the low melting point of the EPS foam shape, and the compressibility issue, the present embodiments include a coating over the EPS in order to protect the shape from impact and the heat, so that the EPS foam shape can still be used under turf or other artificial surfaces, such as poured-in-place rubber.

Through many experiments it was determined that putting a layer of EPP foam over the top provides some desired advantages. A benefit of this layering approach includes protection of the EPS foam from impacts. Since EPP has high compressive strength properties it is able to absorb repeated impacts, which are expected in a playground environment. This also serves as impact attenuation and may provide a fall safety component suitable for playgrounds.

EPP foam is an excellent insulator with a high melting point of about 300 degrees F. Because of this feature, the EPP foam protective layer will keep the heat away from the EPS foam shape and prevent such from melting.

EPP foam is highly resistant to most oils and chemicals where EPS is not. By coating the EPS with the EPP it will allow products with binder, such as poured-in-place rubber, to be used over the top without adverse effects.

Polystyrene foam such as Expanded Polystyrene (EPS) is a rigid and tough, closed-cell foam. It is usually white and made of pre-expanded polystyrene beads. EPS is used for many applications e.g. trays, plates, bowls and fish boxes. Other uses include molded sheets for building insulation and packing material ("peanuts") for cushioning fragile items inside boxes. Sheets are commonly packaged as rigid panels (size 4 by 8 or 2 by 8 feet).

Expanded polyethylene (EPE) foam is a molded semi-rigid, non-crosslinked and closed-cell type of polyethylene foam that has a many applications due characteristics including: Non-abrasive; Flexible; Strong; Lightweight; Non-dusting; highly-resilient; Moisture/weather resistant; Tear/puncture-resistant; Meets Mil-Spec requirements; Odorless; Chemically inert; High load bearing capacity; Cost/labor efficient; Non-corrosive; Buoyant; Thermal insulation; multiple strike energy management; Dimensional stability; Uniform cell structure; Impact & shock absorption; Vibration dampening; Excellent compressive creep properties; Shatter Proof; Bacteria/chemical/grease/mold/oil/solvent-resistant; Less concavity when die-cut (compared to PE & XLPE); CFC-free; Ozone friendly; and Recyclable.

Any other foam materials, such as biodegradable or eco-friendly foams, that have the needed stiffness, durability and other features desired for contoured and elevated artificial surface features, may also be used as the base shape as would be appreciated by those skilled in the art.

Expanded Polypropylene (EPP) is a highly versatile closed-cell bead foam that provides a unique range of properties, including outstanding energy absorption, multiple impact resistance, thermal insulation, buoyancy, water and chemical resistance, exceptionally high strength to weight ratio and 100% recyclability. EPP can be made in a wide range of densities, from 15 to 200 grams per liter, which are transformed by molding into densities ranging from 18 to 260 grams per liter. Individual beads are fused into final product form by the steam chest molding process resulting in a strong and lightweight shape.

As such, the components are made from an environmentally-sound, "green" material that is 100% recyclable, and requires no VOCs (Volatile Organic Compounds), chlorofluorocarbon or other compounds that are recognized as most damaging to the environment.

Downward forces exerted by humans that are walking, running, falling, jumping etc., on the contoured and elevated components are absorbed by the combination of layers. Of course, the thickness of the layers can be chosen based upon the desired balance between stability and load/impact absorption, as would be appreciated by those skilled in the art.

Figure 8:
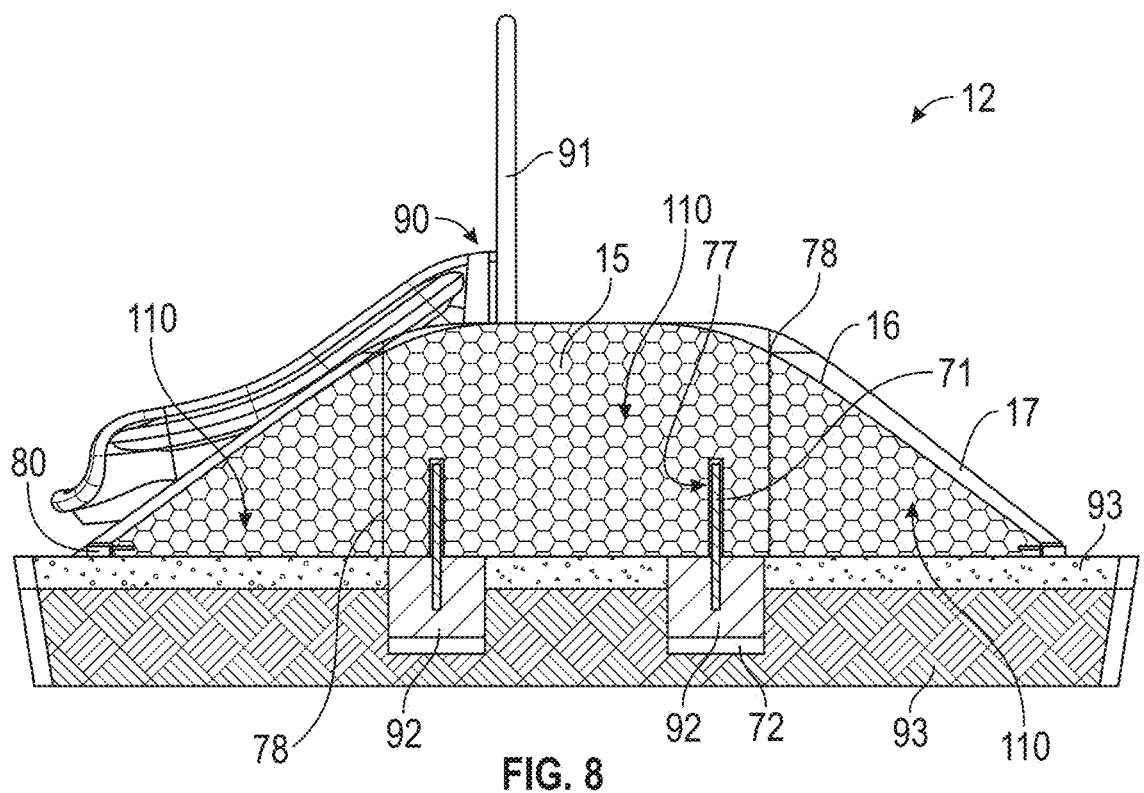
FIG. 8 is a schematic cross section side view of a modular foundation structure according to an embodiment of the present invention shown with an equipment structure.
Figure 10:
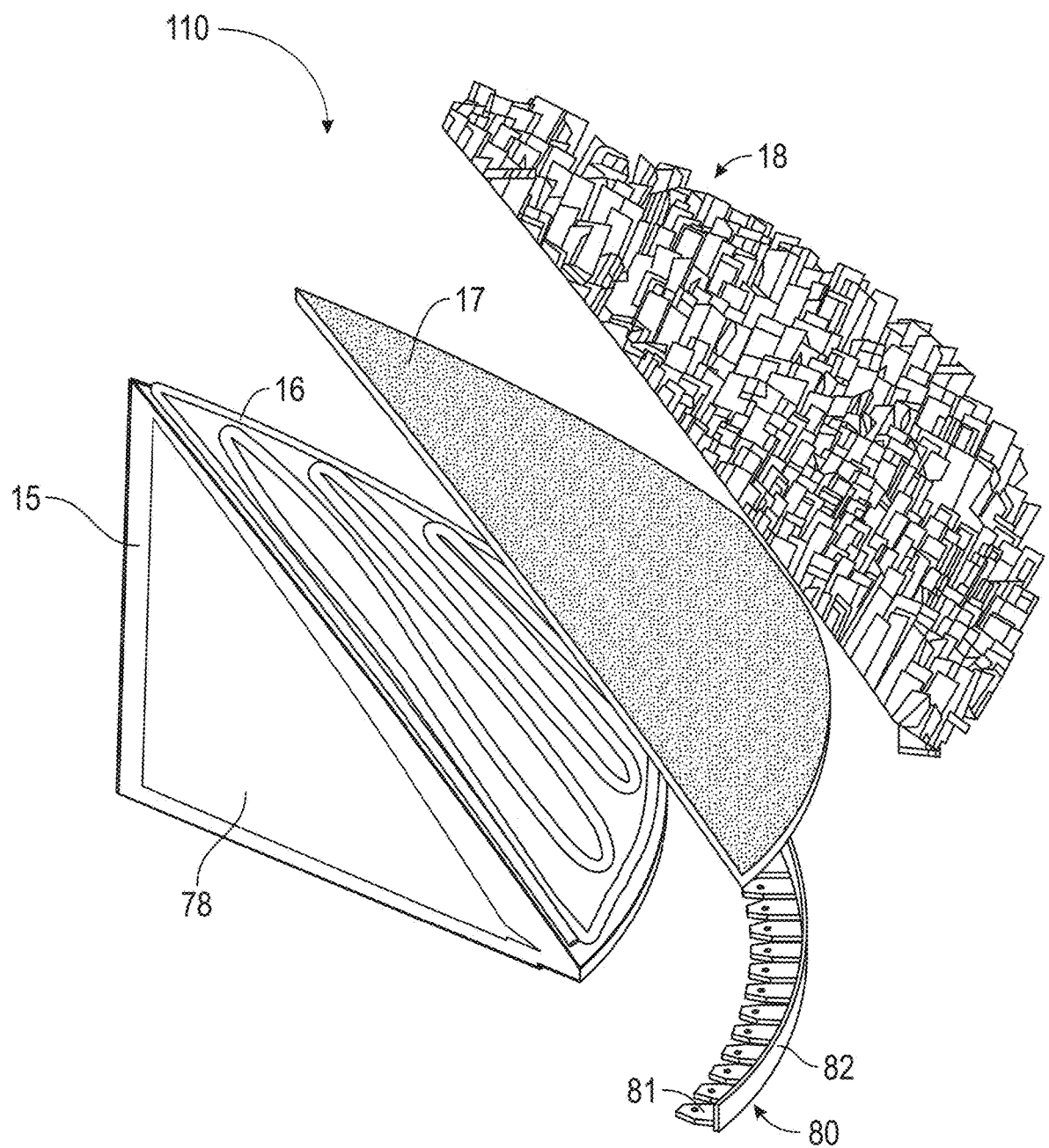
FIG. 10 is an exploded schematic perspective view of a modular foundation section according to an embodiment of the present invention.
Figure 11:
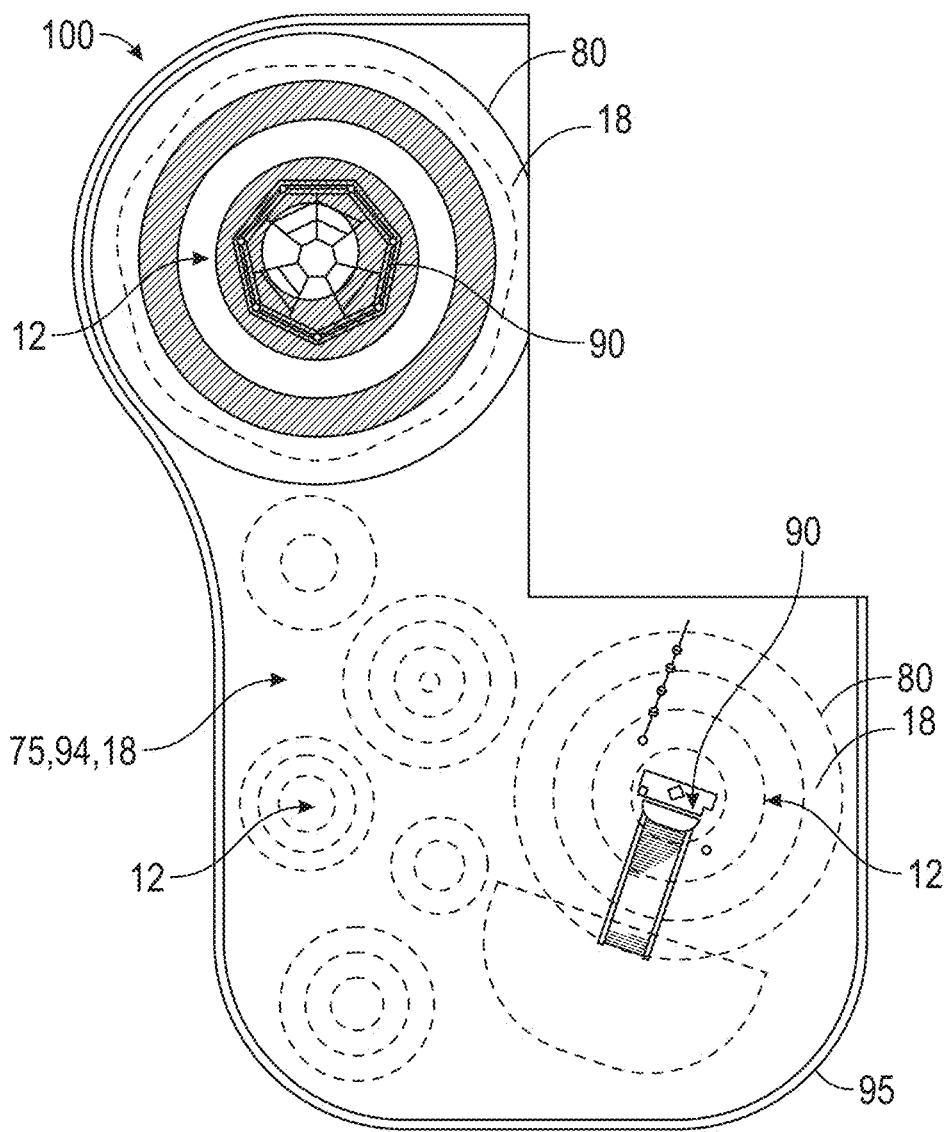
FIG. 11 is a schematic top perspective view of a modular foundation playground according to an embodiment of the present invention.
Figure 12:
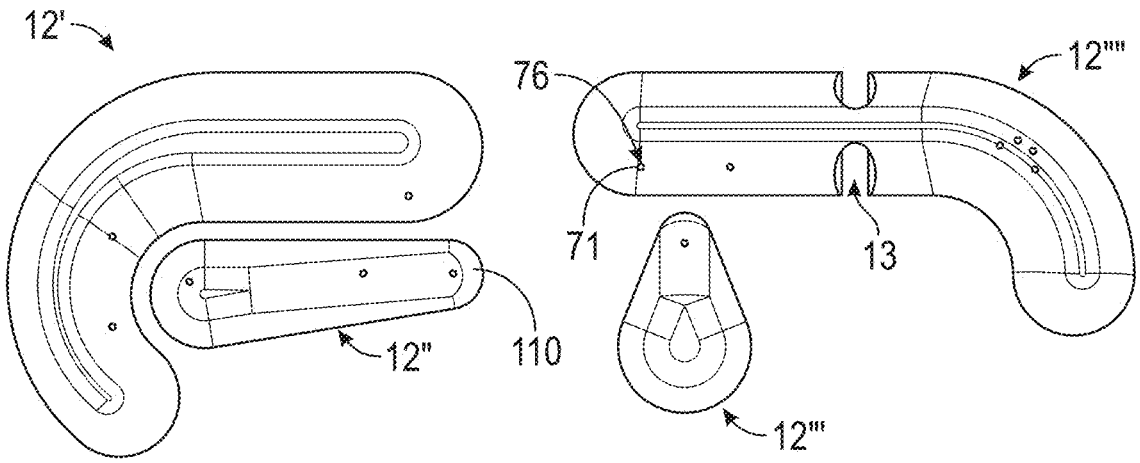
FIG. 12 is a schematic top perspective view of various modular foundation structures according to an embodiment of the present invention.
Figure 18:
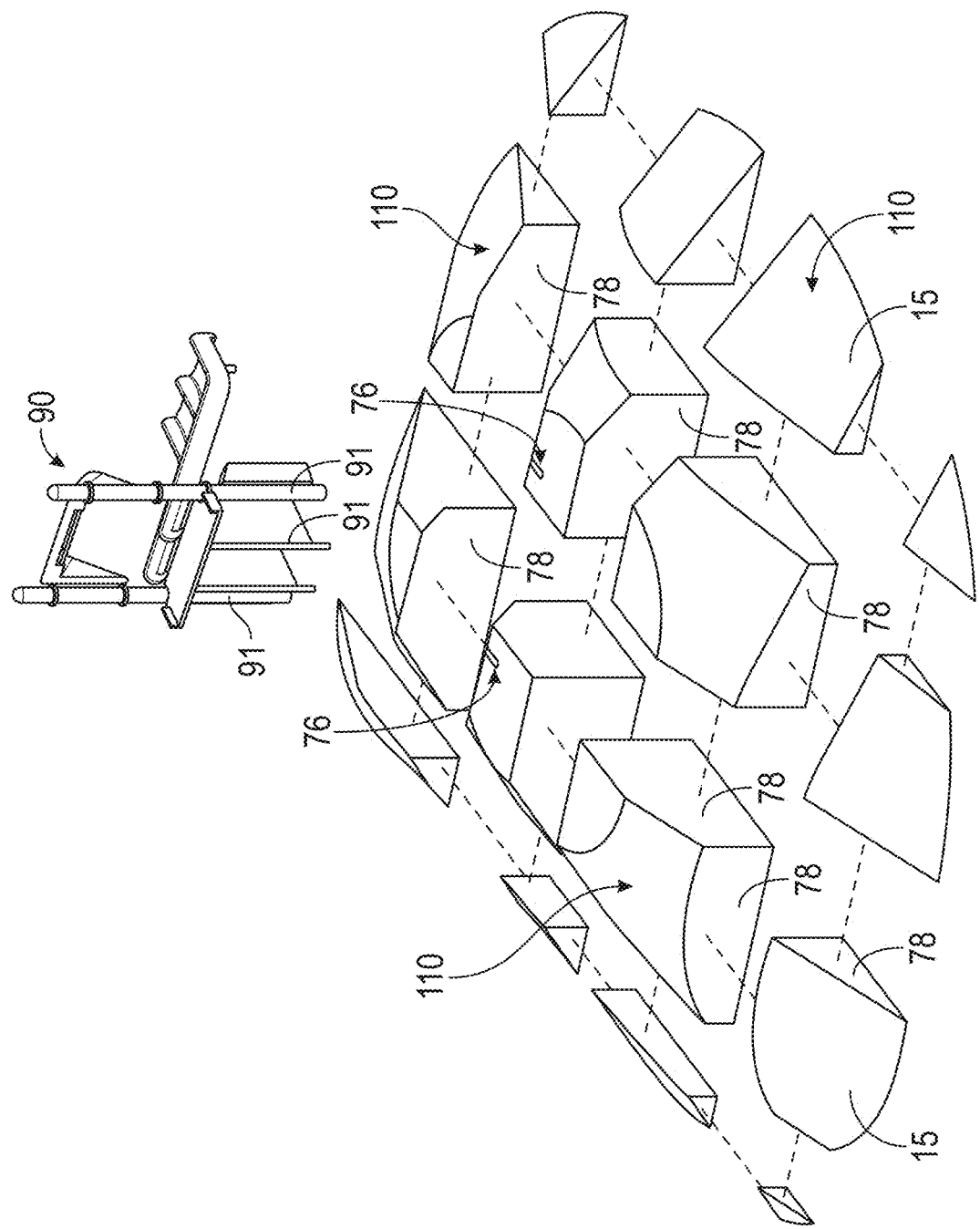
FIG. 18 is an exploded schematic view of a modular foundation structure according to an embodiment of the present invention, with an equipment structure shown.

Now referring to FIGS. 8, 10, and 18, some embodiments of the present invention may include a modular foundation structure 12 that is separated into a number of pieces which may be defined as a plurality of foundation sections 110. The foundation sections 110 may be configured to be positioned adjacent to one another to re-form as the respective modular foundation structure 12. The foundation sections 110 may be attached to adjacent foundation sections 110 by a section adhesive 78. The section adhesive 78 may comprise, without limitation, expandable urethane glue, Expanded Polypropylene (EPP) sheets, or any other adhesive suitable to be used as the section adhesive 78 as understood by those skilled in the art.

One or more of the foundation sections 110 may include one or more of an elongated slot 76 extending through at least a portion of a foundation section 110. The elongated slots 76 may be sized to matingly engage with standing supports 91 of an equipment structure 90. The equipment structure 90 may comprise playground equipment such as, and without limitation, a playground slide, a playground swing, monkey-bars, or any other playground equipment. The elongated slots 76 may be sized to matingly engage the standing supports 91 of an equipment structure 90 so as to allow for the foundation sections 110 to be abuttingly positioned next to one another to form the modular foundation structure 12 without the standing supports 91 conflicting with the foundation sections 110 such that the modular foundation structure 12 may be re-formed. In some embodiments of the present invention, the modular foundation structure 12 and/or the foundation sections 110 of the modular foundation structure 12 may be attached to a podium 73 positioned below the modular foundation structure 12. This attachment may be via an adhesive, such as a chemical adhesive. The podium 73 may be positioned at a slope to encourage water runoff, the slope of the podium 73 may be, for example, a one-fourth inch per foot slope.

Figure 15:
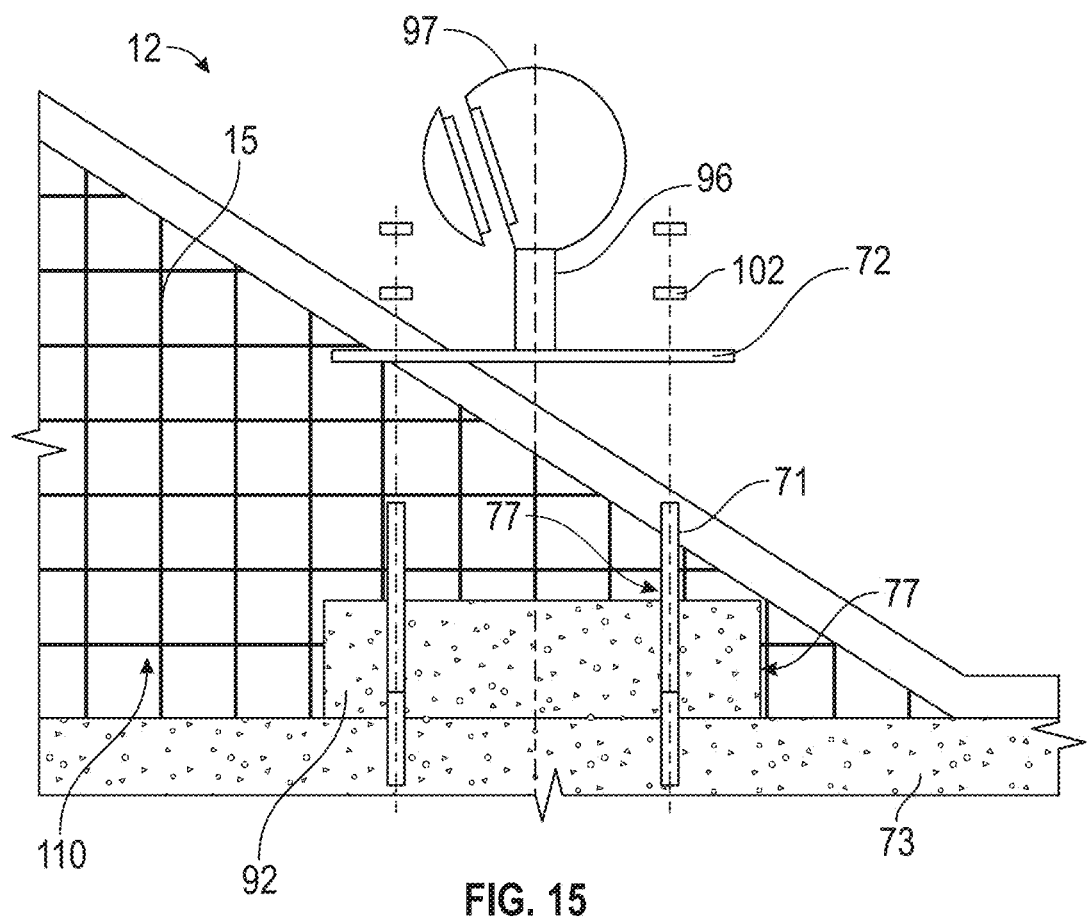
FIG. 15 is a partially exploded schematic cross section side view of a modular foundation structure according to an embodiment of the present invention.
Figure 16:
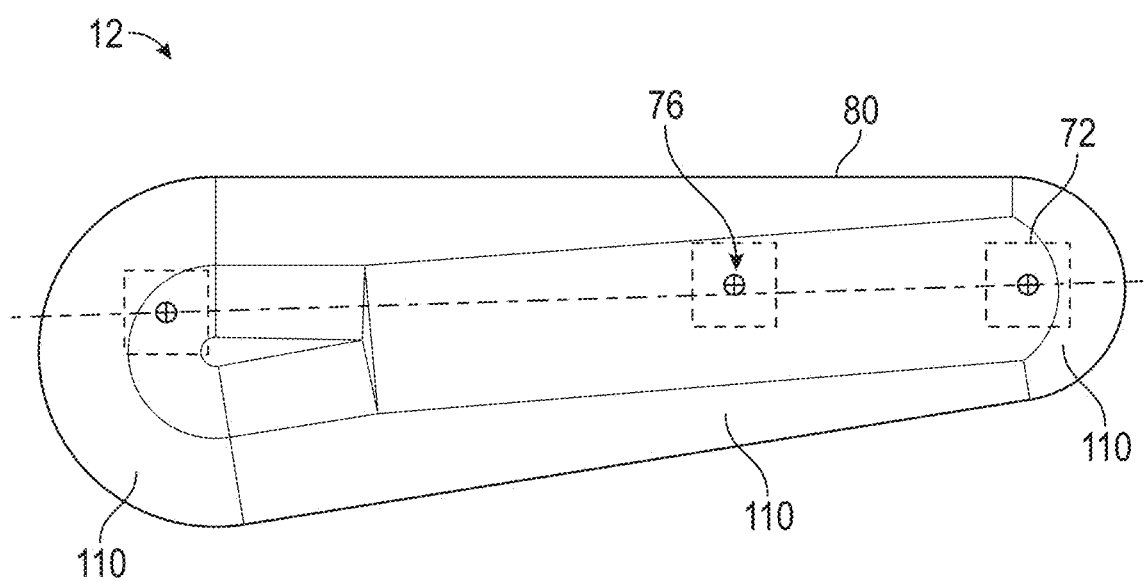
FIG. 16 is a schematic top view of one of the modular foundation structures of FIG. 12.

Now referring to FIG. 15, some embodiments of the present invention may include a respective number of support pads 92 for each standing support 91 of an equipment structure 90. The support pads 92 may be positioned on at a lower portion of the modular foundation structure 12, which may be below a respective standing support 91. The support pads 92 may comprise of concrete. The modular foundation structure 12 and/or at least one of the foundation sections 110 may include one or more of a blind hole 77 that may be sized to envelope, overlay, and/or abuttingly engaged with a respective support pad 92 when the foundation sections 110 are positioned together to form the modular foundation structure 12 such that the foundation sections 110 may not physically conflict with the support pads 92 when the foundation sections 110 are positioned to form the modular foundation structure 12.

Now additionally referring to FIGS. 7A-8, 13, and 15-16, some embodiments of the present invention may include a footer 72. The footer 72 may comprise a plate that may be made of metal, plastic, and/or a composite. Some embodiments of the present invention may include a number of footers 72 equal to the number of standing supports 91 of an equipment structure 90 that the embodiment of the present invention is intended to be coupled with. A footer 72 may be positioned beneath each standing support 91 of the equipment structure 90, and may positioned between the respective standing support 91 and an adjacent support pad 92. The footer 72 may be attached to the respective standing support 91. The footer 72 may also be attached to the adjacent support pad 92 and/or the footer 72 may be attached to a podium 73 that is positioned beneath the modular support structure 12.

Some embodiments of the present invention may include one or more support pads 92 that are positioned beneath the modular foundation structure 12 such that these support pads 92 will not be extending into the modular foundation structure 12 and/or the foundation sections 110 of the modular foundation structure 12 when the foundation sections 110 are positioned to form the modular foundation structure 12, as illustratively shown in FIG. 8. Support pads 92 positioned beneath a modular foundation structure 12 may be extending into layers present underneath the modular foundation structure 12. For example, the support pads 92 may be extending to intermediate layer(s) 75, water protection layers 74, fill mediums 93, and into a podium 73.

Continuing to reference FIG. 8, some embodiments of the present invention may include a pole 71 having a portion thereof extending into an upper portion of a support pad 92, and the pole 71 may have another portion thereof extending into the modular foundation structure 12, one or more of the foundation sections 110, and/or the structural base layer 15 of the modular foundation structure 12. Each support pad 92 that is positioned underneath a modular foundation structure 12 may include a respective pole 71. Some embodiments may also include a footer 72 positioned below one or more of the support pads 92 that are positioned underneath a modular foundation structure 12.

Now referring to FIGS. 7A, 8, 9, 11, 13-15, and 17 embodiments of the present invention may include various forms of platforms and/or surfaces that the modular support structure 12 may be positioned on top of, or adjacent to. Some embodiments of the present invention may include a podium 73. The podium 73 may comprise a hard material, such as concrete, crushed stone, or a compacted substance such as dirt, sand, or concrete fines. Some embodiments may also include a water protection layer 74 that may be positioned overlaying the podium 73, or the water protection layer 74 may be positioned underlying the podium 73. The water protection layer 74 may comprise a material that is water-tight such that water is unlikely to permeate through the water protection layer 74.

Some embodiments of the present invention may include a fill medium 93, such as, without limitation, dirt, crushed stone, gravel, concrete fines, sand and/or any other material that may be used as the fill medium 93 as understood by those skilled in the art. The fill medium 93 may be positioned below the podium 73. Some embodiments of the present invention may not include a podium 73, and instead may include two layers of fill medium 93 that are layered on top of one another, as illustratively shown in FIG. 8. The upper layer of fill medium 93 may comprise crushed stone or gravel, while the lower layer of fill medium 93 may comprise dirt, fill dirt, sand, or concrete fines.

Some embodiments of the present invention may include a playground flooring that may be positioned around, adjacent, and/or next to one or more of the modular support structures 12, as illustratively shown in FIGS. 9, 11, 14, and 17. Specifically referencing FIGS. 7A, 9 and 11, an embodiment of the present invention may include a podium 73 having a water protection layer 74 overlaying the podium 73. Above the water protection layer 74 may be an intermediate layer 75. The intermediate layer 75 may comprise shredded rubber buffings (SBR), a foam cushion layer, and/or expanded polystyrene (EPS). Some embodiments may include a second intermediate layer 75 overlaying the other intermediate layer 75. With the second intermediate layer 75 comprising an SBR, a foam cushion layer, and/or expanded polypropylene (EPP) that is softer than the other intermediate layer 75 which the second intermediate layer 75 is overlaying.

Above one or both intermediate layer 75 that may be a top course 94 positioned as the uppermost layer covering all, or at least a portion of, the intermediate layers 75. The top course 94 may comprise a material that has one or more colors. The top course 94 may also comprise a poured in place rubber. A connection edge 80 may be positioned between artificial surface layers 18 and the top course 94 and/or one or more of the intermediate layers 75 to attach the artificial turf layer 18 to the top course 94 and/or one or more of the intermediate layers 75, the attachment of which may be via an adhesive.

Figure 14:
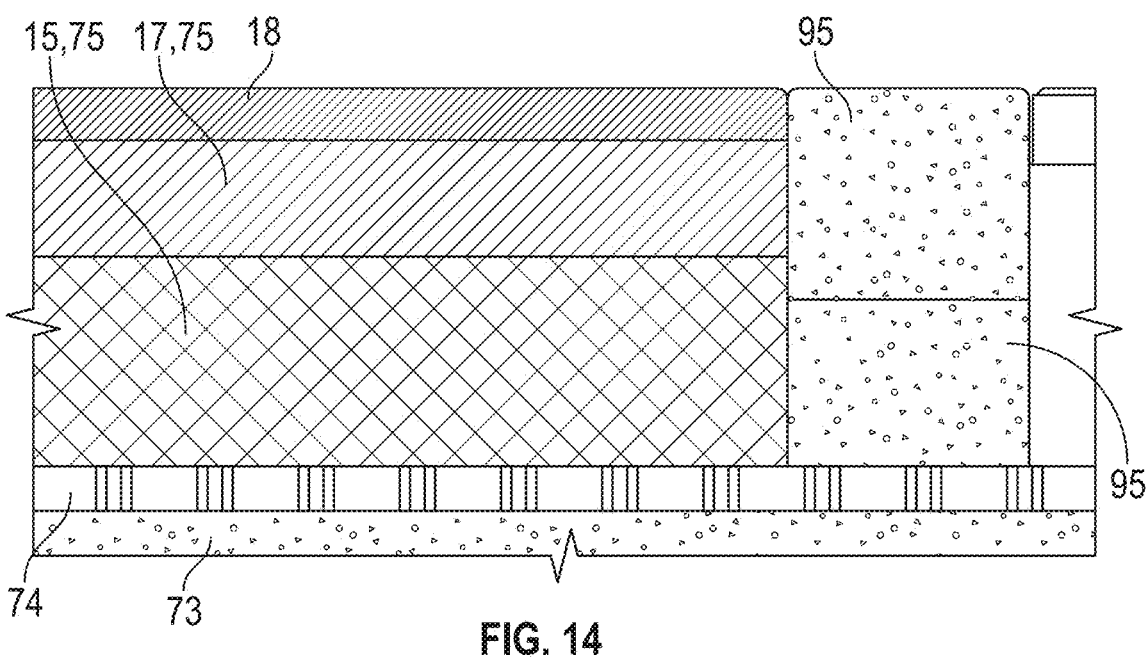
FIG. 14 is a schematic cross section side view of playground flooring according to an embodiment of the present invention.
Figure 17:
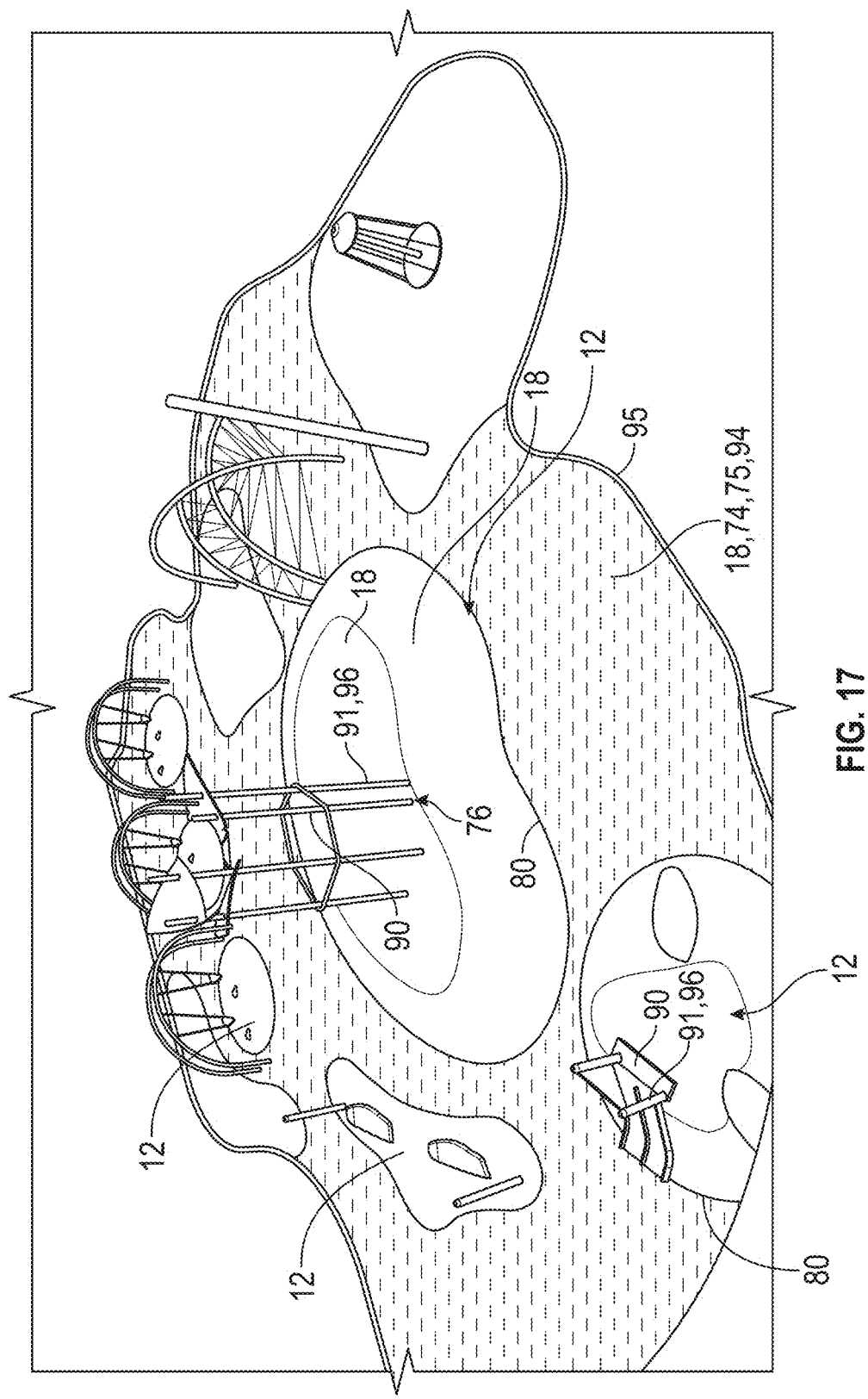
FIG. 17 is a partial schematic perspective view of a modular playground according to an embodiment of the present invention.

Now specifically referring to FIGS. 14 and 17, some embodiments of the present invention may include a barrier 95. The barrier 95 may be positioned surrounding an entire planned playground, such as, the perimeter of a playground. The barrier 95 may be positioned abutting an outer perimeter of the artificial turf layer 18, the top course 94, the intermediate layer(s) 75, the water protection layer 74, and/or the fill medium(s) 93. The barriers 95 may also include one or more through holes that may be used as weep holes to allow for passage of liquids and/or gasses through the barriers 95.

Figure 7A:
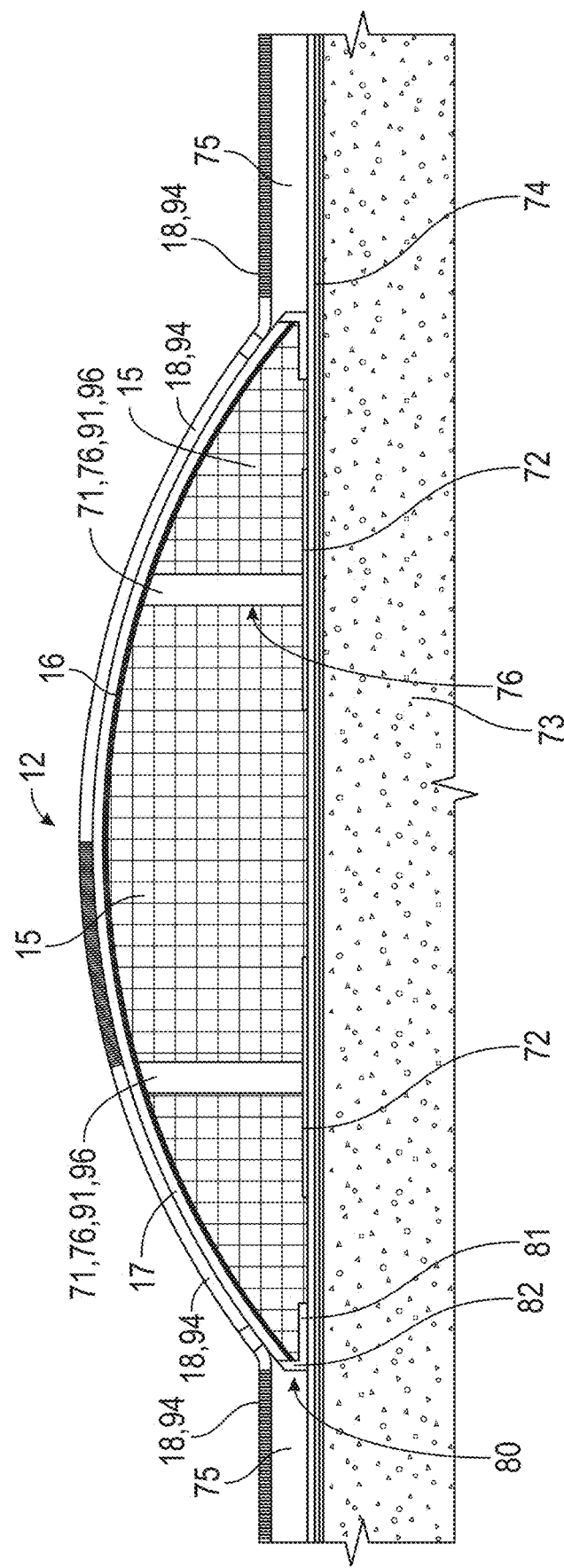
FIG. 7A is a schematic cross section side view a modular foundation structure according to an embodiment of the present invention.
Figure 7B:
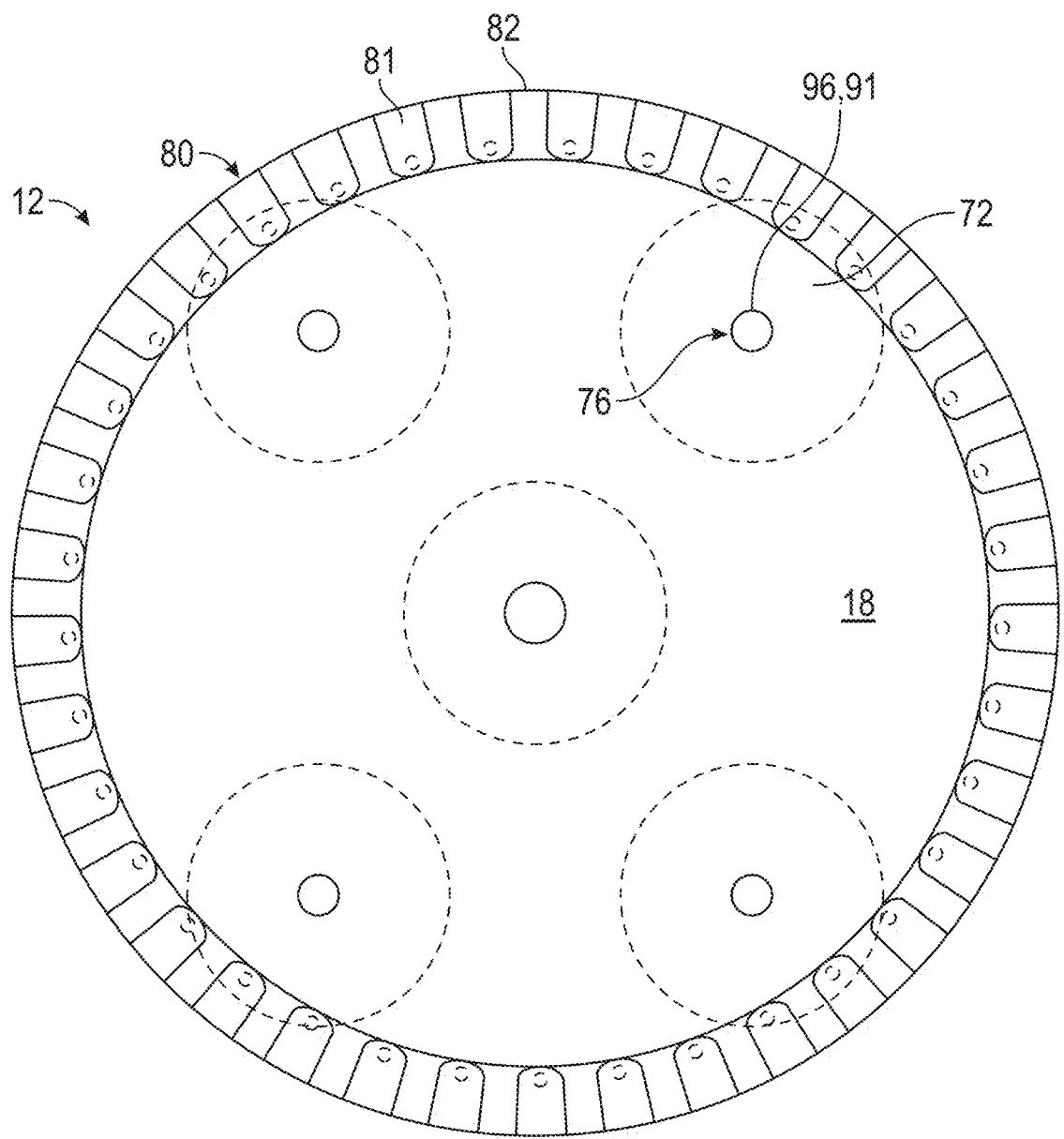
FIG. 7B is a schematic top view illustrating the modular foundation structure of FIG. 7A.

Now referring to FIGS. 7A and 7B, some embodiments of the present invention may include a connection edge 80 that may be positioned abutting a perimeter of a modular foundation structure 12. The connection edge 80 may include a connection line 82 and a plurality of connection tabs 81. The connection line 82 may comprise a ring that surrounds the perimeter of a modular foundation structure 12, the plurality of connection tabs 81 may be attached to the connection line 82. The connection tabs 81 may be positioned under the structural base layer 15 of the modular foundation structure, and the connection tabs 81 may be attached to the structural base layer 15. The connection edge 80 may be positioned adjacent to the artificial surface layers 18 and attached thereto to secure the artificial surface layer 18 to the perimeter of the modular foundation structure 12. The connection edge 80 may comprise high-density polyethylene (HDPE). The connection edge 80 may configured to be flexible such that the connection edge 80 may be formed to the shape of the perimeter of a modular foundation structure 12.

Now referring to FIGS. 11-13, and 17, the modular foundation structure 12 may be shaped to form a variety of shapes when the foundation sections 110 are assembled together to form the modular foundation structure 12. For example, and without limitation, the modular foundation structure 12 may form a shape that defines a mound, tunnel mound, berm, hill, platform, bank, pyramid, wall, bridge, block, and/or a stage. Some embodiments of the present invention may include a tunnel 13 extending through at least a portion of the modular foundation structure 12 and/or extending through at least a portion of at least one of the foundation sections 110, as illustratively shown in FIG. 12. The tunnel 13 may comprise a hard plastic, and the tunnel 13 may be corrugated. Those skilled in the art will notice and appreciate that some embodiments of the present invention may include more than one tunnel 13.

Figure 9:
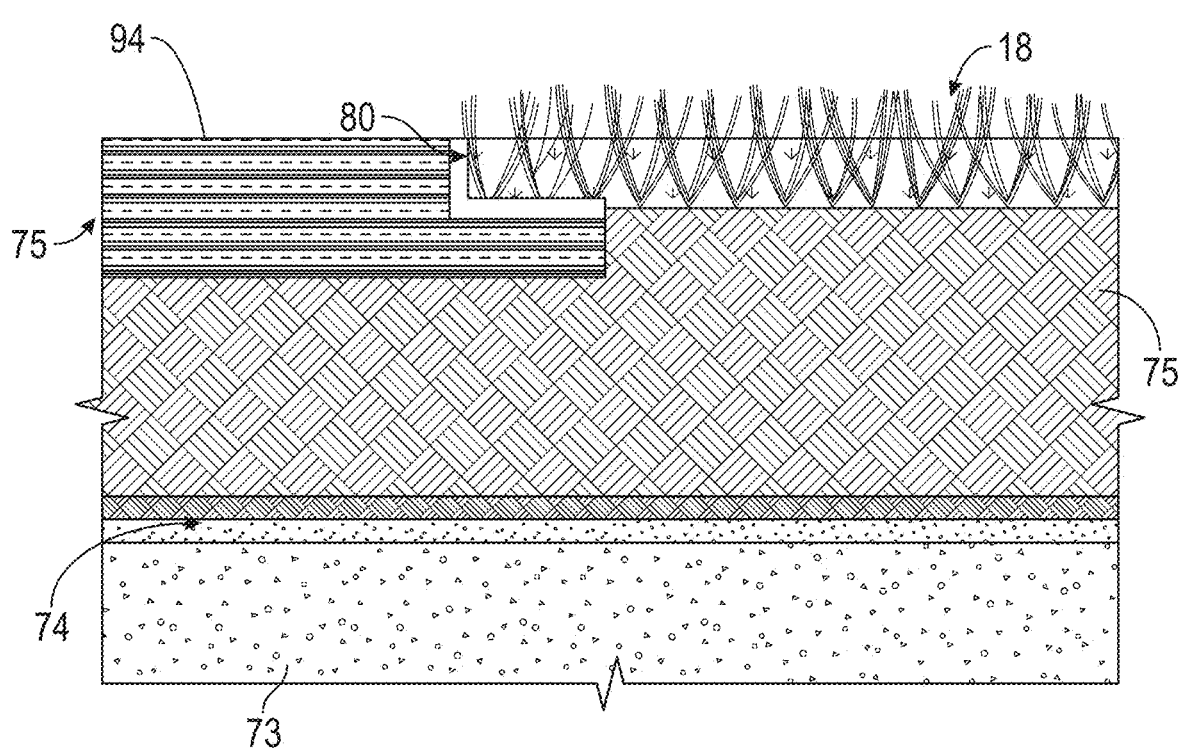
FIG. 9 is a schematic cross section side view of playground flooring according to an embodiment of the present invention.

In some embodiments of the present invention an artificial surface layer 18 may be positioned covering at least a portion of one of the intermediate layers 75, as illustratively shown in FIG. 9. In some embodiments of the present invention the artificial surface layer 18 may be attached to the impact and thermal protective layer 17 and/or one of the intermediate layers 75, which may be attached via an adhesive. In other embodiments of the present invention the artificial surface layer 18 is not attach to the impact and thermal protective layer 17 and/or the intermediate layers 75 and may be simply positioned to cover at least a portion thereof.

Figure 13:
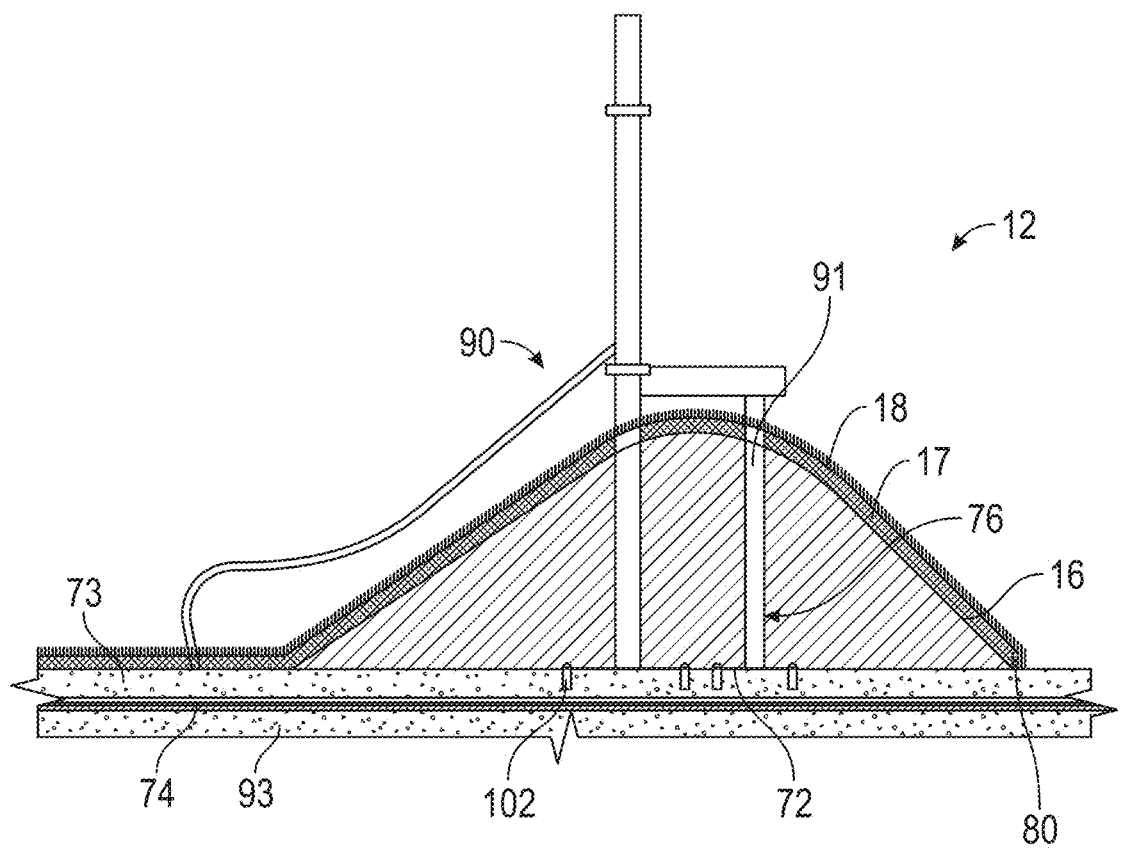
FIG. 13 is a schematic cross section side view of a modular foundation structure according to an embodiment of the present invention shown with an equipment structure.

Now referring to FIGS. 7A, 7B, 13, some embodiments of the present invention may include one or more support poles 96 that may be attached to a respective footer 72, which may be positioned within a modular foundation structure 12 and/or within one or more of the foundation sections 110. The support pole 96 may be formed to allow for a standing support 91 of an equipment structure 90 to be matingly engaged with the support pole 96. The footers 72 may be attached to the podium 73 and/or a respective support pad 92 beneath the footer 72, the attachment of which may be via one or more poles 71 extending into the footer 72, support pad 92, and/or the podium 73 and via one or more attachment members 102. The attachment members 102 may comprise female fixtures such as nuts, and the poles 71 may comprise male fixtures such as anchor bolts and expandable anchor bolts.

Now additionally referring to FIG. 15, some embodiments of the present invention may include one or more support attachments 97. The support attachments 97 may be connected to an upper portion of a respective support pole 96. The support attachments 97 may have portions thereon that allow for a portion of a standing support 91 and an equipment structure 90 to be matingly engaged therein and/or fixed therewith.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

The above description provides specific details, such as material types and processing conditions to provide a thorough description of example embodiments. However, a person of ordinary skill in the art would understand that the embodiments may be practiced without using these specific details.

Some of the illustrative aspects of the present invention may be advantageous in solving the problems herein described and other problems not discussed which are discoverable by a skilled artisan. While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made, and equivalents may be substituted for elements thereof without departing from the scope of the invention.

In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item. Thus, the scope of the invention should be determined by the appended claims and their legal equivalents, and not by the examples given.

The invention claimed is:

1. A modular foundation system for artificial surface systems comprising:
   a podium having a slope to encourage water runoff;
   a water protection layer to overlay the podium;
   at least one modular foundation structure to be positioned overlaying a portion of the water protection layer and including a plurality of foundation sections, each of the plurality of foundation sections comprising:
      a structural base layer comprising a shaped rigid foam having contoured and elevated features;
      an adhesive layer covering the structural base layer; and
      an impact and thermal protective layer attached to said structural base layer via said adhesive layer;
      wherein the plurality of foundation sections are provided as separate foundation sections that are positionable to be attached to one another to create a form of the at least one modular foundation structure; and
      wherein the plurality of foundation sections are attachable one another with a section adhesive; and
   at least one connection edge positioned to surround and abut a perimeter of the at least one modular foundation structure;
   an intermediate layer to overlay a portion of the water protection layer and to surround and abut a perimeter of the at least one connection edge; and
   an artificial surface layer positioned to cover an upper surface area of the at least one modular foundation structure and the intermediate layer;

wherein the artificial surface layer comprises at least one of artificial turf and poured-in-place rubber; and wherein the podium, the water protection layer, the intermediate layer, and the artificial surface layer have an outer perimeter greater than and surrounding the perimeter of the at least one modular foundation structure.

2. The modular foundation system of claim 1, wherein at least one of the plurality of foundation sections includes at least one elongated slot configured to engage with at least one of a standing support and a pole that is attached to a footer such that the plurality of foundation sections are positionable and attachable to one another to create the form of the at least one modular foundation structure therearound.

3. The modular foundation system of claim 1, wherein at least one of the foundation sections includes a blind hole sized to envelop at least a portion of a support pad.

4. The modular foundation system of claim 1, further comprising a tunnel extending through multiple foundation sections of the plurality of foundation sections.

5. The modular foundation system of claim 4, wherein the tunnel is corrugated.

6. The modular foundation system of claim 1, wherein the at least one connection edge comprises high-density polyethylene (HDPE).

7. The modular foundation system of claim 1, wherein the plurality of foundation sections are positionable to be attached to one another to create the form of the at least one modular foundation structure to have a shape defined by at least one of a mound, tunnel mound, berm, hill, platform, bank, pyramid, wall, bridge, block, and stage.

8. The modular foundation system of claim 1, wherein the section adhesive comprises at least one of expandable urethane glue and Expanded Polypropylene (EPP) sheets.

9. The modular foundation system of claim 1, wherein the structural base layer comprises at least one of Expanded Polystyrene (EPS) and Expanded polyethylene (EPE); and wherein the impact and thermal protective layer comprises Expanded Polypropylene (EPP) foam.

10. The modular foundation system according to claim 1, wherein the outer perimeters of the intermediate layer and the artificial surface layer are surrounded by a barrier.

11. The modular foundation system according to claim 10, wherein the barrier includes weep holes to allow for the passage of liquids and gases therethrough.

12. The modular foundation system according to claim 1, wherein the intermediate layer comprises a first intermediate layer and a second intermediate layer; and wherein the first intermediate layer overlays a portion of the water protection layer and the second intermediate layer overlays a portion of the first intermediate layer; and wherein the artificial surface layer is covering the second intermediate layer.

13. The modular foundation system according to claim 12, wherein the first intermediate layer comprises at least one of Shredded Rubber Buffings (SBR), a foam cushion layer, and expanded polystyrene (EPS); and wherein the second intermediate layer comprises at least one of SBR, a foam cushion layer, and expanded polypropylene (EPP).

14. A modular foundation structure to be positioned to overlay a portion of a water protection layer that is overlaying a podium sloped to encourage water runoff, and the modular foundation structure to be surrounded by an intermediate layer overlaying a portion of the water protection layer, the modular foundation structure comprising:
a plurality of foundation sections that each comprise:
a structural base layer comprising a shaped rigid foam having contoured and elevated features;
an adhesive layer covering the structural base layer; and
an impact and thermal protective layer attached to said structural base layer via said adhesive layer;
wherein the plurality of foundation sections are provided as separate foundation sections that are positionable to be attached to one another to create a form of the modular foundation structure; and
wherein the plurality of foundation sections are attachable one another with a section adhesive; and
a connection edge positioned to surround and abut a perimeter of the plurality of foundation sections while the plurality of foundation sections are attached to one another to create the form of the modular foundation structure, the connection edge having an outer perimeter to be surrounded by and abutting a portion of the intermediate layer;
an artificial surface layer to be positioned to cover an upper surface area of the intermediate layer and the plurality of foundation sections while the plurality of foundation sections are attached to one another to create the form the modular foundation structure; and
at least one elongated slot extending through a portion of at least one foundation section of the plurality of foundation sections;
wherein the at least one elongated slot is configured to engage with at least one of a standing support and a pole such that the plurality of foundation sections are positionable and attachable to one another to create the form of the modular foundation structure therearound;
wherein the plurality of foundation sections are positionable to be attached to one another to create the form of the modular foundation structure to have a shape defined by at least one of a mound, tunnel mound, berm, hill, platform, bank, pyramid, wall, bridge, block, and stage; and
wherein the outer perimeter of the connection edge is less than outer perimeters of the podium, the water protection layer, and the intermediate layer.

15. The modular foundation structure of claim 14, wherein at least one of the plurality of foundation sections includes at least one blind hole sized to envelop at least a portion of at least one support pad.

16. The modular foundation structure of claim 14, further comprising a tunnel extending through multiple foundation sections of the plurality of foundation sections.

17. The modular foundation structure of claim 14, wherein the connection edge comprises high-density polyethylene (HDPE).

18. The modular foundation structure of claim 14, wherein the section adhesive comprises at least one of expandable urethane glue and Expanded Polypropylene (EPP) sheets.

19. The modular foundation structure of claim 14, wherein the structural base layer comprises at least one of Expanded Polystyrene (EPS) and Expanded polyethylene (EPE); and wherein the impact and thermal protective layer comprises Expanded Polypropylene (EPP) foam.

20. A modular foundation structure to be positioned to overlay a portion of a water protection layer that is overlaying a podium sloped to encourage water runoff, and the modular foundation structure to be surrounded by an intermediate layer overlaying a portion of the water protection layer, the modular foundation structure comprising:
a plurality of foundation sections that each comprise:
a structural base layer comprising a shaped rigid foam having contoured and elevated features;

an adhesive layer covering the structural base layer; and an impact and thermal protective layer attached to said structural base layer via said adhesive layer;

wherein the plurality of foundation sections are provided as separate foundation sections that are positionable to be attached to one another to create a form of the modular foundation structure; and wherein the plurality of foundation sections are attachable one another with a section adhesive; and a connection edge positioned to surround and abut a perimeter of the plurality of foundation sections while the plurality of foundation sections are attached to one another to create the form of the modular foundation structure, the connection edge having an outer perimeter to be surrounded by and abutting a portion of the intermediate layer;

at least one elongated slot extending through a portion of at least one foundation section of the plurality of foundation sections, the at least one elongated slot configured to engage with at least one of a standing support and a pole such that the plurality of foundation sections are positionable and attachable to one another to create the form of the modular foundation structure therearound; and an artificial surface layer to be positioned covering an upper surface area of the plurality of foundation sections while the plurality of foundation sections are attached to one another to create the form of the modular foundation structure;

wherein at least one of the foundation sections of the plurality of foundation sections includes a blind hole sized to envelop a support pad;

wherein the plurality of foundation sections are positionable to be attached to one another to create the form of the modular foundation structure to have a shape defined by at least one of a mound, tunnel mound, berm, hill, platform, bank, pyramid, wall, bridge, block, and stage;

wherein the artificial surface layer is positionable to cover an upper surface area of the intermediate layer; and wherein portions of the artificial surface layer to be covering the upper surface area of the plurality of foundations sections while the plurality of foundation sections are attached to one another to create the form of the modular foundation structure comprises artificial turf.

* * * * *